(12) United States Patent
Attarwala

(10) Patent No.: US 8,112,163 B2
(45) Date of Patent: *Feb. 7, 2012

(54) EMBEDDED DYNAMIC ALARM CONTROL SYSTEM

(75) Inventor: Fakhruddin T Attarwala, Princeton, NJ (US)

(73) Assignee: Fakhruddin T Attarwala, Princeton, NJ (US)

( * ) Notice: Subject to any disclaimer, the term of this patent is extended or adjusted under 35 U.S.C. 154(b) by 268 days.

This patent is subject to a terminal disclaimer.

(21) Appl. No.: 12/383,343

(22) Filed: Mar. 23, 2009

(65) Prior Publication Data

US 2010/0241247 A1 Sep. 23, 2010

(51) Int. Cl.
*G05B 13/02* (2006.01)
*G05B 13/00* (2006.01)

(52) U.S. Cl. .............. 700/46; 700/28; 700/30; 700/31; 700/34; 318/561

(58) Field of Classification Search ............ 700/19, 700/28–31, 33–34, 46; 318/561
See application file for complete search history.

(56) References Cited

U.S. PATENT DOCUMENTS

| | | | | |
|---|---|---|---|---|
| 4,616,308 A * | 10/1986 | Morshedi et al. | ........... | 700/39 |
| 5,457,625 A * | 10/1995 | Lim et al. | ........... | 700/29 |
| 5,758,047 A * | 5/1998 | Lu et al. | ........... | 700/28 |
| 6,711,527 B2 * | 3/2004 | Bibelhausen et al. | ........ | 702/188 |
| 6,950,711 B2 * | 9/2005 | Havener et al. | ........... | 700/28 |
| 7,187,989 B2 * | 3/2007 | Attarwala | ........... | 700/29 |
| 7,194,318 B2 * | 3/2007 | Attarwala | ........... | 700/29 |
| 7,826,909 B2 * | 11/2010 | Attarwala | ........... | 700/45 |
| 7,930,044 B2 * | 4/2011 | Attarwala | ........... | 700/44 |
| 2008/0082302 A1 * | 4/2008 | Samardzija et al. | ........... | 703/2 |
| 2008/0140227 A1 * | 6/2008 | Attarwala | ........... | 700/30 |

* cited by examiner

*Primary Examiner* — Ramesh Patel

(57) ABSTRACT

A system and method of modeling, prediction, optimization and controlling an embedded alarm control having a plurality of independently controlled, manipulated variables, at least one controlled variables and one or more disturbance variables. The method includes determining simultaneously a set number of dynamic moves of the manipulated variables along with steady state values of the manipulated and controlled variables with steady state constraints relating to the manipulated and controlled variables as well as dynamic constraints relating to the manipulated and controlled variables including relating to the disturbance variables. Embedding alarm controls in the simultaneous dynamic control and steady state optimization with varying type of alarming situations and aiding operator in recovery actions. Performing a receding horizon form of control wherein the optimization and control is performed at successive time interval by monitoring and feedback of process responses resulting from the control actions applied at previous time intervals.

20 Claims, 17 Drawing Sheets

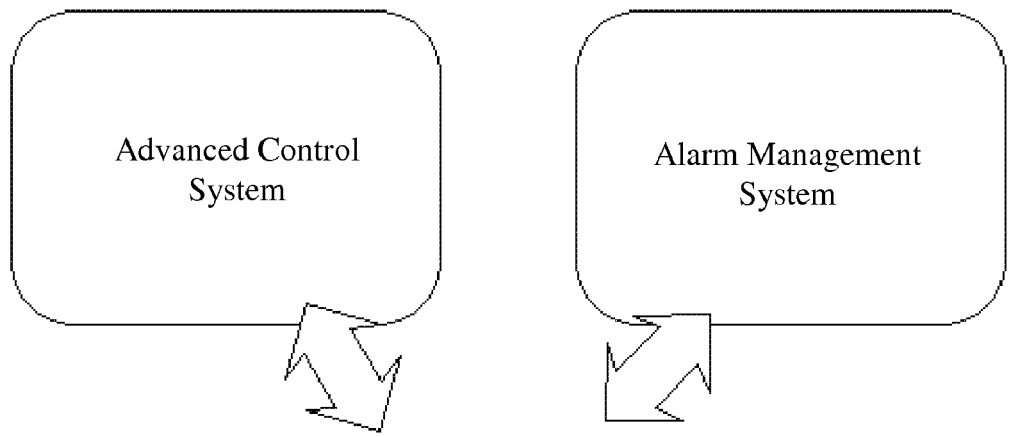
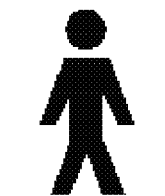
(Prior Art)
Fig. 1
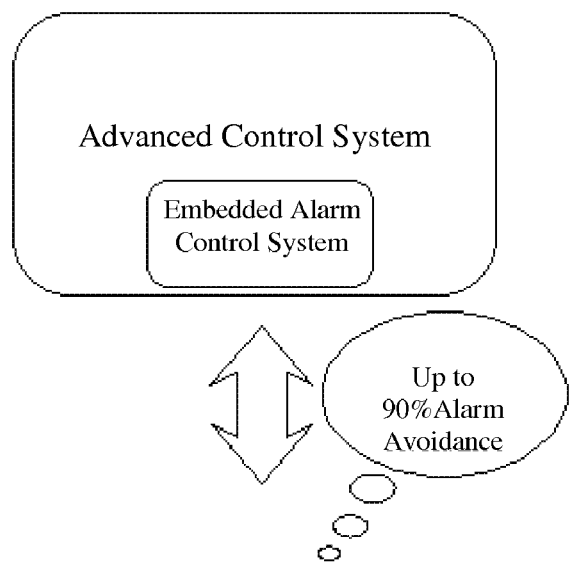
Fig. 2

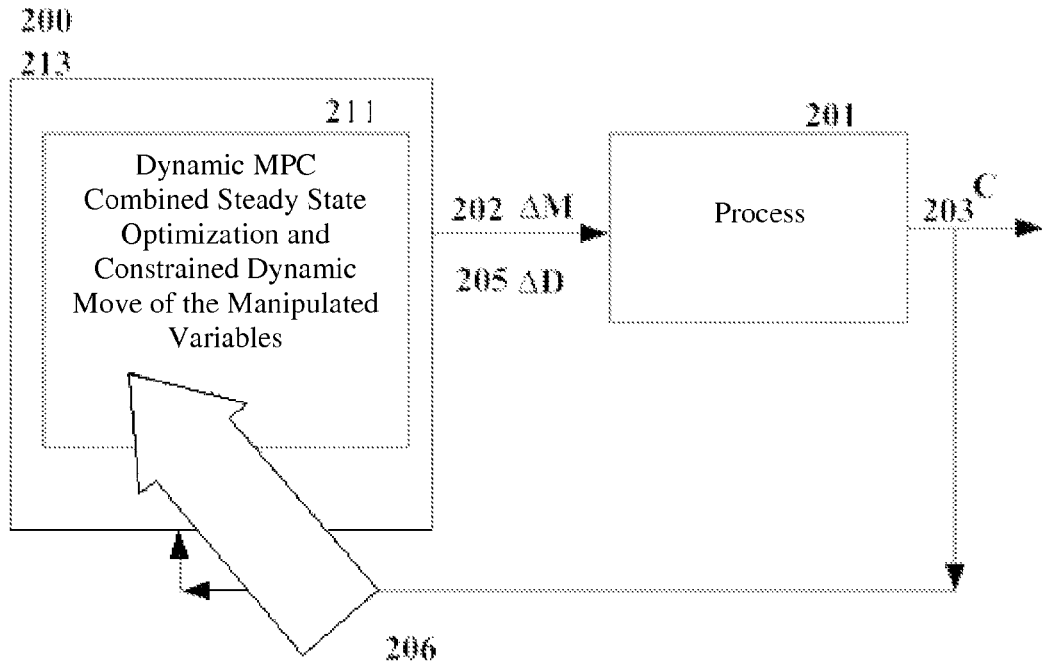

Constraints Embedding Alarm Limits with Control Limits $$-\theta + f_a^{l*}(C_c^l - C_a^l) + C_c^l \leq C_i^k - \underline{C}_i^h + \underline{C}_i^l \leq \theta + f_a^{h*}(C_a^h - C_c^h) + C_c^h \quad 2.4.3$$

$$-\theta + f_a^{l*}(C_a^l) \leq C_i^k - C_i^{kref} - \underline{C}_i^h + \underline{C}_i^l \leq \theta + f_a^{h*}(C_a^h) \quad 2.4.4$$

$$M_c^l - f_a^{l*}(M_c^l - M_a^l) \leq M - M_s^h + M_s^l \leq M_c^h + f_a^{h*}(M_a^h - M_c^h) \quad 2.1.1$$

$$M_a^l \leq M + M_s^h - M_s^l \leq M_a^h \quad 2.1.2$$

$$C_c^l - f_a^{l*}(C_c^l - C_a^l) \leq C - C_s^h + C_s^l \leq C_c^h + f_a^{h*}(C_a^h - C_c^h) \quad 2.2.1$$

$$C_a^l \leq C + C_s^h - C_s^l \leq C_a^h \quad 2.2.2$$

Fig. 3

| ProcessVarID | ProcessVarName | ProcessVarDscp | EngUnit |
|---|---|---|---|
| 147 | U8AI_20PV | Overhead Product ImPurity (%C5+) | %mole |
| 149 | U8AI_22PV | Bottom Product ImPurity (%iC4) | %mole |
| 160 | U8AI05_PV | Feed Quality to De4 | % |
| 150 | U8FI_05SP | Feed Flow Controller Set Point | MBLD |
| 158 | U8FI_06OP | BottomPrd Controller Output | % |
| 154 | U8FI_06PV | Bottom Product Flow | MBLD |
| 169 | U8FI_06SP | Bottom Product Flow SP | MBLD |
| 157 | U8FI_07OP | Top Prd Controller Output | % |
| 153 | U8FI_07PV | Top Product Flow | MBLD |
| 168 | U8FI_07SP | Top Product Flow SP | MBLD |
| 156 | U8FI_10OP | Fuel Gas Controller Output | % |
| 179 | U8FI_10PV | ReboilerTempControllerFuelFlowPV | MFT3HR |
| 164 | U8FI_10SP | Reboiler Fuel Gas Flow | MFT3HR |
| 155 | U8FIC_01OP | Top Reflux Flow Controller Output | % |
| 165 | U8FIC_01PV | Top Reflux Flow Controller PV | MBLD |
| 151 | U8FIC_01SP | Top Reflux Flow Controller Set Point | MBPD |
| 170 | U8LIC_05PV | Top Level | % |
| 173 | U8LIC_05SP | Top Level | % |
| 171 | U8LIC_06PV | Bottom Level | % |
| 174 | U8LIC_06SP | Bottom Level | % |
| 148 | U8PDI_21PV | Column Pressure Differential | psia |
| 163 | U8TI_03PV | FeedTempInlet | degF |
| 159 | U8TIC_03PV | ReboilerTemperature Controller PV | degF |
| 152 | U8TIC_03SP | ReboilerTemperature Controller Set Point | degF |
| 356 | U8PC_01SP | AbsOvhdPressure | psig |
| 357 | U8PC_01PV | AbsOvhdPressure | PSIG |
| 358 | U8PC_01OP | AbsOvhdPressure | % |
| 366 | U8FI_05PV | Feed Flow Controller PV | MBLD |
| 367 | U8TCFI_05PV | Reboiler Feed to TC Feed Flow Controller PV | MBLD |
| 368 | U8TIC03PV | InletToBtmReboiler PV | degF |
| 369 | U8TCTIC03PV | Feed Temp to Rbrl | degF |
| 370 | U8FIRBRPV | Reboiler Feed PV | MBLD |

Fig. 7

Note: Total Number of Alarms 478

Note: Total Number of Alarms 207

EMBEDDED DYNAMIC ALARM CONTROL SYSTEM

FEDERALLY SPONSORED RESEARCH

Not Applicable

SEQUENCE LISTING OR PROGRAM

Not Applicable

BACKGROUND

1. Field of Invention

This invention relates to what is generally known in the process industry as alarm management problem. Process alarms are integral part of process operation in every type and size of operation ranging from the simplest of the process to the complex refinery operation involving process alarms relating to tens of thousands if not more. Alarm management is an important aspect of ensuring environmental, equipment and personnel safety including product quality assurance. It pertains to the very essence of operating a modern day plant operation. Therefore, it is not surprising to find that alarm management ranks the top priority for the management in the entire chemical, refinery and other process industry. The more integrated and the more complex a process operation, the more demanding and challenging are the alarm management problem. The alarm management problem is invariably described in terms of "nuisance" alarms, "avalanche" of alarms, "flooding" of alarms etc. To redress these problems of alarm management, many approaches involving what is generally known in the industry as rationalization of alarms, proper configuration of alarms at the distributed control system (DCS), good documentation, operator training and in-depth root cause analysis off-line (post incidence) and on-line have been tried to a varying degree of success. Ironically, one of the common practice used is what is generally know as "alarm suppression" in the event of a serious plant situation to assist the operator in dealing with the problems at hand. On one hand this approach has validity whereas on the other hand it has the potential of suppressing an alarm or a group of alarm that might compromise safe operation and recovery. None of these various techniques and their combination has solved the problem of alarm management in its entirety. Everyone sees the problem with alarms but nobody knows how to approach it. In every attempt to tackle this multi-faceted alarm management problem, everyone is looking for a magic bullet, but none to be found. The present invention offers an innovative basic tool which has the potential to provide_a basis for tackling this otherwise_challenging problem area.

In almost all process operations, there is a process control system of some kind and there is an alarm system of some kind. Both these systems interrelate minimally. Alarm systems are considered strictly for safety albeit in a reactive and a rather too late condition whereas process control system is considered primarily for control of process operations as it relates to production of products. This is borne out from the fact that invariably when an unsafe operating condition arises in a plant, the advanced control system is taken off and the operator would intervene to bring the process back to safe condition. It is indeed ironic that the advanced control system with all its model predictive control capability as practiced in the prior art is not capable of alarm avoidance. Hereon the word alarm avoidance will be used strictly in the meaning of that is to keep alarm from happening or stay clear of alarm, and not suppressing. Therefore, in this invention alarm reduction is sought by alarm avoidance other than by alarm suppression. In other meaning, alarm avoidance herein means to prevent alarm limit violations by other than suppression. As disclosed in this invention, this shortcoming of the prior art advanced control system stems from the lack of inherent ability to perform what is described herein as dynamic model predictive control. A closer examination of the prior advanced level control system would reveal that there is no explicit consideration of when and how to control a process so as to avoid alarms from happening in the first place and secondly how to control a process so as to get out of or away from an alarm condition in an explicit and direct way. That is to prevent alarm violations in an explicit manner so as to affect the control actions and also to move the process to a safe condition when required by the operator. That is to say, an advanced process control that can solve a multivariable optimization problem of a large number of problems lacks a rudimentary capability to forestall an alarm conditioning from happening. On the other hand, even more elaborate and expensive alarm management system is incapable of assisting an operator in dealing with a true unsafe operating condition. In attempt to make an alarm management system to assist an operator under unsafe operating condition, a separate system such as in the guise of what is described in the industry as "intelligent" alarm management system are increasingly being deployed with limited success. This result in two systems each of immense complexity with minimal direct interconnections is given to the operator to control and manage the process with not much success.

The present invention offers a practical solution that would enable both normal process control and alarm management to be dealt in an integral manner in which alarm control (as against alarm management) becomes a control problem albeit with different characteristics and requirements than the control actions pertinent to optimization and control of production. Another way to state this is to say that the advanced control system based on the present invention would ensure safe operation of the unit no matter how hard the production is optimized. Doing so would enable the advanced control system to function as an alarm-preventing tool as well as alarm management system while it controls the process optimally. Thus, incorporating alarm control would alleviate many aspects of the alarm management problem. For instance, as disclosed later herein the invention offers a method whereby alarm reduction of up to 95-98 percent can be achieved that would eliminate the need for "deviation alarms" entirely while improving the controllability of the process under alarm conditions.

2. Background of the Invention

Since its inception in early 1980, the basic formulation of Model Predictive Control (MPC) has evolved as a bulwark of advanced control involving multi-variables, involving a number of manipulated variables, a number of controlled variables and a number of feed forward/disturbance variables as disclosed in U.S. Pat. No. 4,349,869. In its basic design, the prior art MPC, the controlled variables are controlled to low/high limits. By design, in the prior art, a MPC would certainly include safety related variables along with the product quality variables; for instance, it would have maximum skin temperature for a furnace or maximum reactor bed temperature for a reactor etc. However, due to the limitations of control actions, most of this safety related variables limits are safe-sided for the obvious reason that the advanced control system (ACS) is not capable of controlling the process to the limits reliably and robustly. Thus, the limits set in the advanced control system are invariably safe-sided to provide an operating safe margin. But, ironically, in many instances, unknown to the operator, the advanced control system actions would set up the process vulnerable to violate the true limits either by effects of its own actions or disturbance effects. Here there are two important issues, firstly the control limits used by the ACS are not the true limits and therefore can not be reliably used except with safe-siding; secondly even the most advanced of ACS lack capability to control a process so as to avoid the limit violations dynamically. For these two reasons, it is understandable that in the prior art; the true limits are seldom used. This renders the ACS not relevant to either preventing the alarms or affecting controls to get away from the violations once that happening.

Since MPC forms the bulwark of the advanced control in the industry hereon, we will use it to disclose the invention but not limiting to it in any way, however, what is disclosed herein is applicable to any other forms of control as well. Those skilled in the art would appreciate that the issues, the problems and the solutions are equally relevant to other types of advanced control system lacking what is disclosed herein.

In the prior art, the alarm limits are not taken into account at all except by way of safe siding in setting the controlled variables limits. In many instances, due to lack of robustness and stable closed operation, this safe siding from the true alarm limits is done purposely to avoid the limit violation which then conflicts with the objective of pushing the process to the production limits. This trade off between being able to be safe at all time and yet push the production to the limits at all time is compromised, either too much safe siding is done leading to inefficient operations or pushing the production too hard to expose the process to unsafe operating conditions. Therefore as disclosed herein later, in many instances, the prior art MPC would not perform optimally and robustly safely. In fact, as disclosed further herein, this safe siding from the alarm limit in itself does not really help, in fact in many instances it may hinder the controller ability to recover from the violation or in approach to it.

SUMMARY

A key problem with the prior art MPC is that they typically ignore the true alarm limits of the variables that could be used to control the process to avoid alarms from happening in the first instance and secondly to control the process so as to recover from the alarm violations.

An object of the present invention is to thus provide a system and method, which would explicitly incorporate alarm limits of the variables to constrain both optimization and control actions and thus significantly improve both the alarm avoidance and recovery from any violating alarm conditions. The objective of the present invention is to disclose a method of and a system of advanced control wherein the numbers of alarms are significantly reduced while pushing the process to its maximum production limits.

BRIEF DESCRIPTION OF THE DRAWING

FIG. 1 is a block diagram of the Prior Art
FIG. 2 is a block diagram of the present invention
FIG. 3 is a block diagram illustrating Dynamic MPC with Embedded Alarm Controls as per the present invention
FIG. 7 is Process Variables of DeButanizer Example

DETAILED DESCRIPTION

U.S. patent application Ser. No. 11/999,056 (US Publication No. 20080140227) titled Dynamic Model Predictive Control filed by the present inventor is hereby incorporated by reference in its entirety as though fully and completely set forth herein.

The present invention relates to what is described herein as alarm control system that would perform avoidance of alarm by predicting alarm violations and determine corrective actions necessary to preventing alarm activations within and as part of advanced control system that is used for control and optimization of a process or processes. Thus, the alarm control system is termed as being embedded within the advanced control system or also simply referred to as embedded alarm control. Therefore, in accordance with the present invention, alarm control system is considered to be a particular characterization of control requiring its own considerations within the framework of what is typically done in the prior art for normal operation control and optimization. This is a clear departure from the common practice in the prior art of having a separate alarm management system and a separate advanced control system. In fact, a careful examination of the details relating to the method of alarm management system and the advanced control system used in the prior art would reveal that there is no direct and explicit way of interrelating them so much so that when the alarms become active the advanced control system more often than not is taken off line.

In fact, in most process-upset situation, the operator would rely on the alarm management system to manage the process. In a metaphorical sense, typically alarm management system is not meant to provide alarm control; it is designed to assist the operator in the event of an alarm occurring or in the aftermath of loss of control of the process or in other words, assist the operator to make best of a bad situation. Whereas, the motivation of present invention is to act on incipient alarms, prevent them and when actually happen maintain the process integrity and provide a significantly aggressive but stabilizing control actions from the advanced control system so as to enhance the recovery to normal operation safely and timely.

For the sake of exposition, only the specific details relating to the embedding of alarm control within the advanced control system is illustrated and discussed by way an exemplary description. Those skilled in the art would understand and know that the description would not be limiting the general and wider applicability of the invention.

Figure 4:
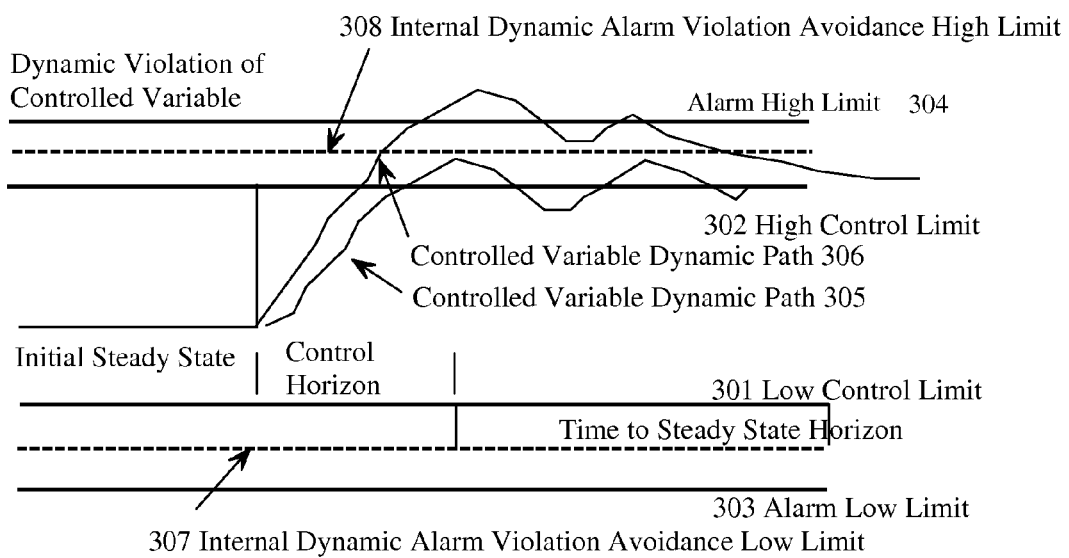
FIG. 4 is illustration of dynamic violation of a controlled variable with Embedded Alarm Limits

FIG. 4 illustrates a simplified and exemplary view of a controlled variable limit violation. As shown, the low/high control limits used in the prior art MPC are typically set in consideration of the process limitations. For most part, these control limits are set away from the true (alarm) limits for the reason of safe siding in the prior art as disclosed earlier. These control limits are done at the onset of commissioning a MPC and perhaps revised now and again, but at no time there is an explicit and direct relationship incorporated within the prior art MPC to connect the control limits used within it to the alarm limits used by the DCS system.

It is interesting to examine further how a prior art MPC would respond to two dynamically violating situations as shown in FIG. 4. Both 305 and 306 are shown as violating the high control limit 302, whereas 306 is shown as violating the high alarm limit as well. Both 305 and 306 is predicted to attain the same steady state and hence the steady state optimization solution in both these two cases would be the same assuming everything else being the same. However, the dynamic move calculations in each case would be different. Although in the case of 306, with bigger violation it therefore would result in more aggressive control action from the prior art MPC as compared to the control actions for 305. It would seem that this should be of no consequences. However in consideration of the high alarm limit violation, it would seem that in case of 305 indeed there is no need for control move at all. Whereas in the case of 306, clearly there is a need for control move to avoid the high alarm limit violation in future time. Since a prior art MPC does not include the alarm limits explicitly, instead in this case would use the high control limit as the violating limit for dynamic control move determination resulting in a rather aggressive control move than what is really warranted. Thus, for 306, although it would seem that the prior art MPC would take control actions rightly, however, the control move would be more aggressive than what is really warranted with respect to the high alarm limit violation. Hence in both these two cases, the prior art would be inappropriately aggressive. Therefore, even though the control limits are set to provide safe siding, the manner in which the prior MPC can respond with its control actions contrary to the design can cause the alarm limits to be violated if it is already in the vicinity or induce even further violations. This is a self contradictory unexpected phenomena underlying the prior art MPC using the control limits as depicted in FIG. 4.

It is interesting to note further that in response to such aggressive or unstable operation at or near control limits, often attempt is made to detune the controller precisely to counteract the unnecessary aggressive control actions explained above. This detuning it would seem should help, however, once the process moves away from the control limits, the control actions become sluggish in avoiding or preventing the violation next time around. With these incompatible control actions, it is not surprising that a prior art MPC does not work very well at or near the control limits. It lacks the right kind of control actions just when needed. As would be disclosed herein further and the results presented herein would show that the controller re-tuning is not the answer. Instead, the present invention offers a direct and explicit method of control that in fact incorporates precisely the control actions required to deal with the violating response at or near the alarm limits. Alarm violation avoidance is not meant to suppress an alarm, instead to affect the control actions so as to prevent the alarms incidence in the first place. By embedding alarm control limits explicitly within constrained optimization, the control actions that otherwise would have caused alarm incidence would be affected so as not to cause the alarm incidence. There will always be alarms that could simply not be avoided caused by the measured/unmeasured disturbances, but the alarms that otherwise would be caused could be avoided as per the present invention.

The proposed invention disclosed herein would reveal that such incompatible control actions can be avoided and in turn the effectiveness of the control actions can be made to be consistent with the violating situations. Thus, the present invention proposes to overcome a serious deficiency of the prior art MPC in its design and functioning.

In accordance with the present invention, it is disclosed that a model predictive control incorporating an explicit dynamic optimization as disclosed in a prior patent application (US Patent Publication No 20080140227) by the present inventor be utilized in conjunction with the proposed method of control configuration disclosed herein. We will refer to the prior invented method of dynamic optimization in a model predictive control as Dynamic Model Predictive Control or simply (DMPC) without loss of generality. The reference to DMPC is used as a means of illustrating workings and set up of how to handle alarm limits. Those skilled in the art would appreciate that the disclosed method herein could be incorporated in another suitable control system capable of avoiding dynamic violation of controlled variables.

The basic requirement of operation of a process unit experiencing a continual and prone to violating its alarm limits is to adjust the control limits in a way that would prevent the alarm limits violation either as a result of measured/unmeasured disturbances and the controller's own actions within the dynamic move calculation explicitly and directly. The basic requirement in regard to alarm limit violation is that dynamically a controlled variable is more than likely to violate the alarm limit at times either due to the process being pushed to its limits or due to disturbance effects. In practice almost all, alarming system utilize what is commonly known as dead band outside of the violating limit to control alarm state. That is, every time a process variable violates its alarm limit by a small amount, there is no real need for initiating an alarm annunciation to the operator. Only when the violation has crossed a certain dead band then only an alarm is raised. Thus, once a variable is violating its alarm limit outside of the dead band it remains in alarm state (though not necessarily on continuous annunciation). As the variable crosses back to the limit and is within the dead band the alarm state can be removed indicating that the variable is recovering from the violation and therefore it need not concern the operator. In the present invention, therefore, the difference between the control limits and the alarm limits form the dead band referred above.

The present invention proposes to incorporate within its dynamic move calculation in effect a method of compensation in anticipation of alarm limit violation and the manner in which the alarms are typically annunciated and handled it so as to avoid the alarms to become active in the first instance and in the event an alarm limit is predicted to be violated then to compensate for it so that it would not occur at future time. The end result of this would be to decrease the incidence of alarms significantly on one hand and on the other hand to provide for controlled recovery from the violation if the violation becomes unavoidable.

Figure 5A:
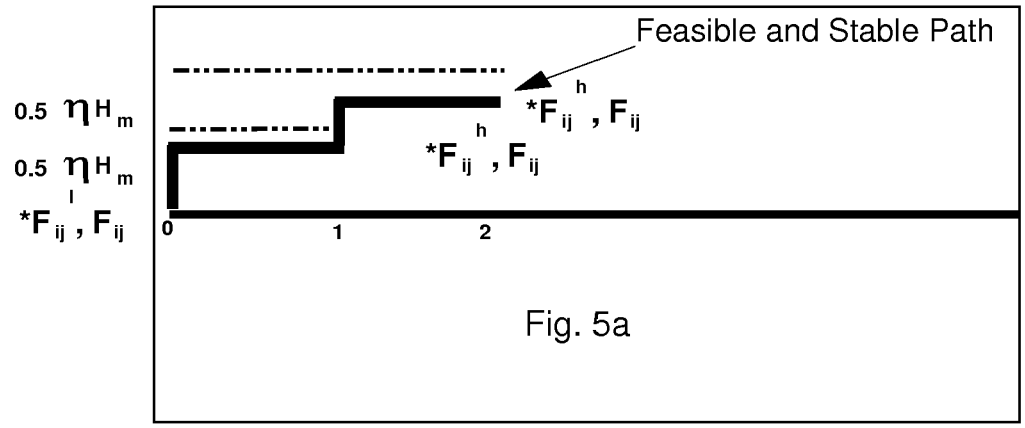
FIGS. 5a, 5b and 5c are graphical representations of the present invention

This requirement of the present invention necessitates that within the dynamic move calculation of the DMPC, the constraints for dynamic value of the controlled variables be modified as disclosed further below herein. In summary, the present invention proposes to use for each of the controlled variables a tuning factor that would increase or decrease the control limits to move it closer or away from the alarm limits in accordance with the size of the dead band desired. That is depicted in FIG. 5a as internal dynamic alarm avoidance limits (307, 308).

The process 201 characterized in FIG. 3 can be a simple process involving one input variable and one output variable or a more complex process involving multiple input variables and multiple output variables. The problem of dynamic violation of the controlled variables become much more difficult and challenging as the size of the process become large with the prior art MPC.

In FIG. 3, 213 constitutes what is described in the prior patent referenced herein as Dynamic Model Predictive Control combining steady state optimization and dynamic move calculation in one constrained optimization.

In FIG. 3, an improved control system is proposed in which the dynamic MPC is used in conjunction with the embedded alarm limits as proposed by the present invention is shown.

It is assumed that the process is characterized by a set of variables, such as $M^d$ represents dynamic values of manipulated variables
$C^d$ represents dynamic values of controlled variables
$D^d$ represents dynamic values of disturbance variables,
M represents steady values of manipulated variables
C represents steady state values of controlled variables
D represents values of disturbance variables at initial time
At steady state, $C=C^d$, $M=M^d$
Further, it is assumed that
there are m number of manipulated variables,
there are c number of controlled variables,
there are d number of disturbance variables.

The process 201 is considered to be a dynamic system, and the controlled variables dynamic response is characterized by the following $$(C, C^d) = G(M^d, D^d) \quad\quad 1$$

Where G describes dynamic response of the controlled variables as $(C, C^d)$ to a given set of dynamic moves in $M^d$ and dynamic disturbance future changes in $D^d$. $(C, C^d)$ is considered to consist of steady state response as C and dynamic response as $C^d$. Of course, in the steady state of the process $C^d$ attains value of C. For the purpose of formulation, both C and $C^d$ are considered as separate where appropriate. In addition to variable $M^d$, for the purpose of steady state optimization, its steady state variable will be used as M. It is important to note that $D^d$ is essentially considered as external variables not determined by the optimization solution but rather affecting it. For typical, MPC application, $D^d$ relates to actual dynamic change as measured at the start of control cycle while for most part future dynamic changes in it considered to be unknown and hence zero. However, the formulation presented herein does permit a rather more interesting case wherein the dynamic changes in D in future can be included as further disclosed under further embodiment of the present invention.

The object of the dynamic MPC with feed forward variables future trajectory as proposed by the present invention is to optimize an objective function involving $(C, C^d, M, M^d)$ subject to a set of constraints relating to the variables $(C, C^d, M, M^d)$ with the process dynamics characterized by Eqn1 above, as stated below that would result in determination of optimal value of $(C, C^d, M, M^d)$. Since, $(C, C^d)$ being dependent variables, in essence the proposed dynamic optimization yields $(M, M^d)$ as the optimal solution.

As disclosed in the prior patent application by the inventor, the following is incorporated herein for reference followed by the changes to the formulation pertinent to the present invention at the end of it.

The objective function, J is to be maximized as in a general form as below and as an exemplary form as in Eqn 2.

$$J = F(M, C, D^d, M^d, C^d) + \Sigma\Sigma P^l_c C^l + \Sigma\Sigma P^h_c C^h \quad\quad 1.1$$

where F is some optimizing function for the process over the time horizon of time to steady state for the process. Thus, as formulated above, J is to be optimized in consideration of both steady state change and pertinent dynamic moves determined by the optimization process described further herein. However, in most practical applications, $F(M, C, D^d, M^d, C^d)$ is really of form $F(M, C, D)$, not including dynamic variables. Those skilled in the art would appreciate that not including dynamic variables $(M^d, C^d)$ does not really impair the formulation presented here forth. Thus, hereon, we can assume the optimizing function to be of form $F(M, C, D)$ without loss of generality.

For the purpose of exposition but not limiting, a simple form of the optimizing function will be followed hereon as $$J = P_m M + P_c C + \Sigma\Sigma \underline{P}^l_c \underline{C}^l + \Sigma\Sigma \underline{P}^h_c \underline{C}^h \quad\quad 2$$

Eqn 2 incorporates steady state optimization function and sum of all penalty of all low/high dynamic violation of the controlled variables. It is understood that those skill in the art would anticipate the various alternate forms of $F(M, C, D^d, M^d, C^d)$ that could be incorporated within the optimization process described herein. For the sake of exposition but not limiting, hereon G is considered to be a linear dynamic model of step response (discrete time) type commonly used in model predictive control field. That is to say, using a discrete coefficient dynamic model for the process, the steady state value of the controlled variables is determined by $$C_i = C_i^* + \Sigma g_{i,j}(M_j - M_j^*) + \Sigma g_{i,l}(D_l - D_j^*)$$

And the dynamic value of the controlled variables is determined by $$C_i^k = C_i^{k*} + \Sigma\Sigma g_{i,j}^k \Delta M_j^k + \Sigma\Sigma g_{i,l}^q \Delta D_l^q$$

Subject to:

$$M^l \leq M \leq M^h \quad\quad 2.1$$

$$C^l \leq C \leq C^h \quad\quad 2.2$$

$$C_i = C_i^* + \Sigma g_{i,j}(M_j - M_j^*) + \Sigma g_{i,1}(D_1 - D_j^*) \quad\quad 2.2.1$$

$$-\Delta M_j^l \leq \Delta M_j \leq \Delta M_j^h \quad\quad 2.3$$

$$0 \leq \Delta M_j^+ \leq \Delta M_j^h \quad\quad 2.3.1$$

$$0 \leq \Delta M_j^- \leq \Delta M_j^l \quad\quad 2.3.2$$

$$\Delta M_j = \Delta M_j^+ - \Delta M_j^- \quad\quad 2.3.3$$

$\Delta M_j^l = M_j^l - M_j^*$ where $M_j^*$ being Current Value of $M_j$ $$\Delta M_j^k = M_j^k - M_j^{k-1} \text{ for } k=2\ldots k_{MV} \quad\quad 2.3.4$$

$$\Delta M_j^k = 0 \text{ for } k=k_{MV}+1\ldots k_{CV} \quad\quad 2.3.5$$

$$\Sigma \Delta M_j^k = M_j - M_j^* \quad\quad 2.3.6$$

$$-\theta \leq C_i^k - C^{k\,ref}_i - \underline{C}^h_i + \underline{C}^l_i \leq \theta \quad\quad 2.4$$

$$0 \leq \underline{C}^h_i \quad\quad 2.5$$

$$0 \leq \underline{C}^l_i \quad\quad 2.6$$

$$C_i^k = C_i^{k*} + \Sigma\Sigma g_{i,j}^k \Delta M_j^k + \Sigma\Sigma g_{i,j}^q \Delta D_l^q \qquad 2.7$$

Where $M^l$ is low limit of the manipulated variables, M
$M^h$ is low limit of the manipulated variables, M
$C^l$ is low limit of the controlled variables, C
$C^h$ is high limit of the controlled variables, C
$\Delta M_j$ is dynamic move of manipulated variable, j
$\Delta M_j^+$ is positive dynamic move of manipulated variable, j
$\Delta M_j^-$ is negative dynamic move of manipulated variable, j
$\Delta M_j^l$ is low limit of dynamic move of manipulated variable, j
$\Delta M_j^h$ is high limit of dynamic move of manipulated variable, j
$\Delta M_j^k$ is dynamic control move of the manipulated variable $M_j$ at time k from now
$M_j$ is the optimal steady state target of the manipulated variable, j
$M_j^*$ is the current value of the manipulated variable, j
$Dl_j$ is the current value of disturbance variable, l
$D_l^*$ is the previous time period value of disturbance variable, l
$C_i^*$ is the currently predicted steady state value of the controlled variable
$C_i$ based on the recent past process condition
$C_i$ is the steady state value as determined by the optimization
$C_i^k$ is predicted value of Controlled Variable, $C_i$ at k time interval from now
$C_i^{k\,ref}$ is desired value of Controlled Variable, $C_i$ at k time interval from now, this is further explained below.
$\overline{C}_i^h$ is high limit dynamic violation variables of the Controlled Variable, $C_i$
$\underline{C}_i^l$ is low limit dynamic violation variables of the Controlled Variable, $C_i$
$C_i^{k*}$ is dynamic value of Controlled Variable $C_i$ at time k based on the past process condition
$g_{i,j}$ is the steady state gain of the step response model of the Controlled Variable, $C_i$ for a unit change in the manipulated variable, $M_j$
$g_{i,j}^k$ is the step response coefficient of the process model of Controlled Variable, $C_i$ for a unit change in the manipulated variable, $M_j$
$\Delta D_l^k$ is change in $D_1$ at time k
$g_{i,lj}^k$ is the step response coefficient of the process model of Controlled Variable, $C_i$ for a unit change in said disturbance variable, $D_l$
θ is a permitted tolerance for deviation of the predicted dynamic value of the controlled variable from its reference path, a small number.
$P_m$ is the price value for the manipulated variables, typically a negative value representing cost and a positive value representing benefit.
$P_c$ is the price value for the controlled variables, typically a negative value-representing penalty and a positive value representing benefit.
$P_c^l$ is a large penalty value to be applied for the controlled variable violating its low limit dynamically
$P_c^h$ is a large penalty value to be applied for the controlled variable violating its high limit dynamically
k relates to future time from now on, k=1 ... $k_{MV}$ ... $k_{CV}$
q relates to future time from 1 ... $q_{FV}$
where $k_{MV}$ relates to the control horizon for manipulated variables moves, no manipulated variables to be applied beyond this time horizon so as to permit the controlled variables to attain their steady state, whereas $k_{CV}$ relates to the time to steady state for the controlled variables, it would be the longest time to steady state for the changes in the manipulated variables, M plus the longest control horizon. For simplicity and sake of exposition, it will be assumed that it relates to the maximum time to steady state considering all of the responses of the controlled variables for the changes in all of the manipulated variables plus the longest of the control horizon of all of the manipulated variables, where $q_{FV}$ is ranged in accordance with future known values $D^d$ is vector of dynamic values of disturbance variables in terms of its future values, for most part hereon D will be used in place of $D^d$ without loss of generality In the prior invention application by the present inventor, all of the pertinent details relating to the DMPC are fully described and are hereby incorporated fully by reference. Only changes pertinent to the present invention will be disclosed and discussed herein.

As per the present invention constraints 2.4 are further modified to permit the avoidance of alarm violation as follows recognizing that $C_i^{k\,ref}$ can be modified suitably when dealing with various categories of controlled variables, such as equipment limits, product quality limits including deviation of regulatory controlled variables such as temperature, pressure etc from their respective set points.

$$-\theta + f_a^{l*}(C_a^l - C_c^l) \le C_i^k - C_i^{k\,ref} - \underline{C}_i^h + \overline{C}_i^l \le \theta + f_a^{h*}(C_a^h - C_c^h) \qquad 2.4.1$$

Constraints 2.4.1 can be used to set up in a varying manner depending on the extent of alarm avoidance that is sought. This will be illustrated with a couple of examples. For product quality related controlled variables, constraints 2.4.1 can be modified as $$-\theta + f_a^{l*}(C_a^l - C_c^l) + C_c^l \le C_i^k - C_c^h + \overline{C}_i^l \le \theta + f_a^{h*}(C_a^h - C_c^h) + \overline{C}_c^h \qquad 2.4.2$$

where $C_c^l$ is control low limit
$C_a^l$ is alarm low limit
$C_c^h$ is control high limit
$C_a^h$ is alarm high limit
$f_a^l$ is an operator set factor for the low alarm limit in the range (0,1.0)
$f_a^h$ is an operator set factor for the high alarm limit in the range (0,1.0)
θ is a small value for numerical tolerance close to zero value
$C_i^{k\,ref}$ is replaced by $C_c^l$ at low limit violation and by $C_c^h$ at high limit violation Constraints 2.4.2 effectively embeds the alarm limits with the control limits. Since, these constraints are explicitly incorporated within the combined steady state and dynamic move control calculation as described above, it provides for a means of affecting the controller moves that would avoid the controlled variables violation in the vicinity of the alarm limits. The $f_a^l$ and $f_a^h$ essentially set a dead band in the vicinity of the alarm limit and the control limit that could be used in the alarm avoidance move calculation. These operator set factors can be changed at any time to vary the extent of alarm avoidance, a smaller value would ensure greater avoidance. Constraints 2.4.2 are termed as Limit Violations Constraints.

In the case of dealing with regulatory control related variables such as reboiler temperature or overhead pressure, constraints 2.4.1 can be modified as follows $$-\theta + f_a^{l*}(C_d^l) \le C_i^k - C_i^{k\,ref} - \underline{C}_i^h + \overline{C}_i^l \le \theta + f_a^{h*}(C_d^h) \qquad 2.4.3$$

where $C^l_d$ is deviation alarm limit from the desired set point target $C^{k\ ref}_i$ on low side $C^h_d$ is deviation alarm limit from the desired set point target $C^{k\ ref}_i$ on high side $f^l_a$ is an operator set factor for the low deviation alarm limit $f^h_a$ is an operator set factor for the high deviation alarm limit θ is a small value for numerical tolerance close to zero value Constraints 2.4.3 are termed herein as Set Point Violation Constraints (or as SP Violations Constraints). It must be noted that for regulatory controlled variables constraint 2.4.3 would be additional set of constraints in addition to constraints 2.4.2. Thus, in the proposed method of alarm avoidance, for regulatory control variables, there would be two sets of constraints namely, Limit Violation Constraints for protecting against the absolute values such as against maximum reboiler temperature limit and namely SP Violation Constraints for protecting against what is generally known in the art as deviations from the set point at any time. Deviation alarms are commonly used in the industry to inform the operator of loss of control at the regulatory control level for the reasons of control output saturation or dynamic response which is either too fast or too slow indicating the underlying regulatory control is either too fast or too slow. In a process-upset situation, these deviation alarms come on first followed by the limit violation alarms. As a result in most process-upset situations, too many deviations alarms come on. These deviations alarms are meant to be meaningful in a relatively stable operation leading to the controller output saturation etc but not really useful in a process-upset situation. In a way in an actual process-upset situation, the deviation alarms are expected and hence the operator does not really need to know and hence often they are considered as "nuisance alarms". In Constraints 2.4.4, $f^l_a$ and $f^h_a$ can be relaxed temporarily to suppress deviation alarms if desired in a process-upset situation.

Closed Loop Dynamic Predictive Alarming

Another embodiment of the present invention is in regard to what is described herein as "Closed Loop Dynamic Predictive Alarming" or simply "Predictive Alarming". That is, alarming in future time. In "Predictive Alarming", when a controlled variable is predicted to violate the alarm limit in closed loop, that violation is alarmed in the sense that the operator is informed about it. The predictive violation of alarm is meant to inform the operator that with all of the past control actions, past disturbance variables effects, future control moves and including future scheduled feed forward changes, the controlled variable is predicted to violate its alarm limit and the extent of violation. These violations can be displayed on the DCS monitor as time based future values in various manner such as graphical display or tabular values. Depending on the mode of operation, the operator can be asked to see if the embedded alarm system were allowed to remove or minimize the predicted violations. Alternatively, if the operator had previously authorized the corrective actions, then the embedded alarm system would automatically go ahead and take corrective actions. The embedded alarm system would continue to monitor the predicted violations and if necessary take corrective action. At any time, the operator can choose to suspend the automatic predictive alarm violation correction. In that case, the embedded alarm system if required can continue to monitor but not act. In "Predictive Alarming" mode of operation, the EDACS is working to move the process away from the predicted alarm violations and return process back to the normal control limit operation in a stable controlled manner.

For Predictive Alarming, a set of adjunct constraints relating to the controlled variables is added in conjunction with the constraints 2.4.

$$-\theta + A^l_a \leq C^k_i - \underline{A}^h_i + \underline{A}^l_i \leq 0 + A^h_a \qquad 2.4.4$$

where additionally, $A^l_a$ is alarm low limit $A^h_a$ is alarm high limit $\underline{A}^h_i$ is dynamic violation variables of the Controlled Variable, $C_i$ from $A^h_a$ $\underline{A}^l_i$ is dynamic violation variables of the Controlled Variable, $C_i$ from $A^l_a$ θ is a small value for numerical tolerance close to zero value Both $\underline{A}^h_i$ and $\underline{A}^l_i$ are treated in the same manner as $\underline{C}^h_i$ and $\underline{C}^l_i$ albeit with different penalties in the modified objective function as follows.

$$J = P_m M + P_c C + \Sigma\Sigma p^l_c \underline{C}^l + \Sigma\Sigma p^h_c \underline{C}^h + \Sigma\Sigma p^l_c \underline{A}^l + \Sigma\Sigma p^h_c \underline{A}^h \qquad 1.1.1$$

Where additionally, $p^l_c$ is a large penalty value to be applied for the controlled variable violating its alarm low limit dynamically $p^h_c$ is a large penalty value to be applied for the controlled variable violating its alarm high limit dynamically Thus, with the additional constraints, 2.4.4 and the modified objective function, the DMPC is set up to handle embedded predictive alarming and corrective action. Since, for most part, in practice, a process is operated to be within the control limits with the alarm limits set to protect product quality, equipment, personnel and environment from process upsets and sudden process changes. Therefore, by design, the control limits are contained within the alarm limits. They can be closed but obviously not same. The difference in these two types of limits is a matter of safety considerations and risk management. However, in accordance with the present invention, by embedding both these two types of limits to work seamlessly, explicitly and directly, a much improved and effective method of managing these two types of limits can be administered within a plant or production system. The present invention offers a novel and unique method of interrelating both these two types of limits within the framework of advanced control that would not only control the process more robustly within the control limits, but under a process upset situation, it can act appropriately to prevent alarm limit violations in predictive manner thereby providing a early recovery actions and thereby prevent environmental impact or product degradation or equipment damage and consequently improve personnel safety.

The method of predictive alarming disclosed above can be made to work with different level of alarm limits such as Alarm High Limit 304, Alarm High High Limit, Alarm High Limit, Alarm Low Limit, Alarm Low Low Limit and so on by including additional constraints of 2.4.4 and including additional terms in the objective function 1.1.1 as shown above. Thus it is possible to have a multi-level of alarm limits embedded within the method alarm control in accordance with the present invention.

In the event of a process-upset situation, in many instances, an advanced process control system is unable to continue to control the process due to the manipulated variables limits constraints. That is to say, the controller lacks the MV-range to control the process. Or in other words, the optimizer hits an infeasible solution based on its prediction of the controlled variables future values. Typically, the MV-range is set in accordance with the normal operating range experience, not too wide. However, in a process-upset situation, the MV-range may be too restricting for the advanced controller to continue to control the process. For instance, typically, feed rate range for a process unit would be set based on normal operating range conditions, however, in a process-upset situation, it may be necessary to reduce the feed rate beyond the low control limit. In a prior art MPC, in this case, the controller would simply give up and the operator would need to intervene. It would seem that the controller could have handled the process upset if only the low control limit of the feed rate was relaxed. This is a case in which the prior art MPC could continue to perform if it was not for the ability to relax a manipulated variable constraint in a process-upset situation. A further embodiment of the present invention offers a seamless method of handling process upset situations requiring any relaxation of the manipulated variables control limits up to the alarm limits. Like alarm limits for a controlled variable, alarm limits for a manipulated variable perform in much the same way.

As noted in the earlier patent application relating to DMPC, manipulated variables have what is considered to be steady state constraints as well as dynamic moves constraints within the steady state constraints forming a cone like profile. Unlike controlled variables, manipulated variables constraints remain strictly binding at all time in that at no time they can be violated. However, as noted above in a process-upset situation, unless the MV-range is relaxed appropriately, the controller would yield an infeasible solution and hence not make any further moves. To overcome this deficiency of the prior art MPC, in the present invention, a provision is made to relax the MV-range as needed up to the alarm limits so as continue to control the process beyond its control limits. Therefore, it is envisaged that in a process-upset situation, the Embedded Dynamic Alarm Control System (EDACS) when finds itself needing to move the manipulated variables outside of the control limit would first determine the new MV-range, inform the operator, on approval from the operator, then use that to recover from the process-upset. Upon, returning to the control limits, as per the present invention, the EDACS would inform the operator of not needing the alarm limits use. The operator then can choose to remove the previously authorized use of the expanded MV-range. Of course, at any time as per the present invention, the operator would still have the flexibility to control how close to the alarm limits, he would permit the MV-range to be expanded.

Manipulated Variables Range Relaxation

With this ability of dynamically expand the MV-range up to the alarm limits, provide for a flexible method of dealing with a varying degree of process-upset conditions at the full discretion of the operator. It provides for a continual use of the EDACS beyond the control limits at the discretion of the operator in dealing with varying degrees of process-upset situations.

For the above mentioned embodiment of the present invention, constraints 2.1 is further modified as $$M^l_c - f_a^{l*}(M^l_c - M^l_a) \leq M - M^h_s + M^l_s \leq M^h_c + f_a^{h*}(M^h_a - M^h_c)$$ 2.1.1

$$M^l_a \leq M + M^h_s - M^l_s \leq M^h_a$$ 2.1.2 where
$M^h_s$ is optimizer slack variable for violating high limit with penalty value
$M^l_s$ is optimizer slack variable for violating low limit with penalty value
$M^h_c$ is high control limit
$M^l_c$ is low control limit
$M^h_a$ is high alarm limit
$M^l_a$ is low alarm limit $f_a^h$ is high control limit relaxation factor
$f_a^l$ is low control limit relaxation factor Constraints 2.1.1 and 2.1.2 provide for operator-controlled relaxation of the control limits pertaining to a manipulated variable in the event of a process upset situation requiring the EDACS continue to perform control actions. In accordance with constraint 2.1.1, under normal operating condition, both $f_a^l$ and $f_a^h$ would be zero and $M^h_s$ and $M^l_s$ would not be present in the optimizer as slack variables. In the event of in a process upset situation requiring the manipulated variable range relaxation, it is envisaged that the EDACS would determine an initial feasible solution with $f_a^l = 1.0$ and $f_a^h = 1.0$ with both $M^h_s$ and $M^l_s$ included in the optimizer as slack variables with the appropriate penalty values. The EDACS would determine the value of $M^h_s$ and $M^l_s$ indicating by how much either the high control limit or low control limit need to be changed. Note that constraints 2.1.2 ensure that at no time the alarm limits of the manipulated variable is violated in any way. The operator can be informed of the new desired limit and upon his approval implement the new limits. Thus constraints 2.1.1 and 2.1.2 in conjunction with the rest of the EDACS provide a method of relaxing the control limits of a manipulated variable to up to its alarm limits under the control of the operator in a process upset situation.

Controlled Variables Range Relaxation

It is possible that in a severe process-upset situation, the manipulated variables control limits relaxation mentioned above might not be enough in which case ultimately it would be necessary to relax the controlled variables control limits for steady state. For this, constraints 2.2 is modified further as follows $$C^l_c + f_a^{l*}(C^l_a - C^l_c) \leq C - C^h_s + C^l_s \leq C^h_c + f_a^{h*}(C^h_a - C^h_c)$$ 2.2.1

$$C^l_a \leq C + C^h_s - C^l_s \leq C^h_a$$ 2.2.2 where
$C^h_s$ is optimizer slack variable for violating high limit with penalty value
$C^l_s$ is optimizer slack variable for violating low limit with penalty value
$C^h_c$ is high control limit
$C^l_c$ is low control limit
$C^h_a$ is high alarm limit
$C^l_a$ is low alarm limit
$f_a^h$ is high control limit relaxation factor
$f_a^l$ is low control limit relaxation factor Constraints 2.2.1 and 2.2.2 are in effect an equivalent form of constraints 2.1.1 and 2.1.2 for controlled variables. Therefore, in a severe process-upset situation wherein the control limit relaxation of the manipulated variables either not permitted or not possible further then the controlled variables control limits can be relaxed under the operator's control. Once again the operator can be informed of the extent of relaxation needed to continue control and upon his approval then the EDACS would use the relaxed control limits for recovering from the upset condition. Like in the manipulated variables control limit relaxation, the operator can remove the control limit relaxation option when the process recovers.

The alarm limits referred to in the above disclosure of the present invention may relate to various level alarm limits such as High Limit, High High Limit, Low Limit, Low Low Limit. Any of these types of alarm limits can be used without loss of generality. Those skilled in the art would understand that the alarm limits referred in the above disclosure can take different values and hence would not be limiting in any way the present invention.

Summarizing, in the present invention a three part modification of the EDACS is presented which would be used under different process upset situations. This include embedding alarm limits for alarm avoidance, relaxing control limits of both manipulated variables and/or controlled variables in dealing with a severe process upset situation so as to be able to continue to use the EDACS in assisting the operator to guide the process back to the normal control limits operation.

On-Demand Alarm Violation Correction

Another further embodiment of the present invention is described as it relates to how to handle alarm relating the variables NOT included within the scope of an advanced control system. It is a common practice in the industry that only a sub-set of all process variables are included within the scope of an advanced level control system. Variables most relevant to the normal operations are the ones, which are obviously included within the scope of an advanced control system. As per the present invention, any and all variables within the scope of the EDACS could have embedded alarm limits as and when appropriate. This raises the question what happens to alarm handling of the variables left out of the scope of the advanced controller. It is proposed that within the framework of the EDACS and in accordance with the present invention, additional controlled variables and manipulated variables can be interjected in response to an alarm condition. For instance, when a variable not included within the scope of the EDACS becomes alarm active, in response to that the operator could be given an option to include it within the scope of the EDACS. Assuming that this new variable was configured appropriately to be included within the scope of the EDACS, it is proposed that the variables list be expanded and the embedding of its alarm limit can be performed in real time. This would mean that an advanced controller, which would ordinarily would not include this additional variable, would have its scope of variables expanded to include it and be ready and able to assist the operator in response the upset process situation. Thus, the operator would still have the continual use of the rest of the advanced control in managing the process recovery. It is therefore not necessary to shed the controller simply because a variable is not ordinarily not included in the controller but need to be included in a particular process upset situation in response to an alarm condition affecting it. This embodiment of the present invention is aptly termed as On-demand Alarm Violation Correction.

Use of Asymmetrical Control Action Including Applying Braking Action

As part of embedding alarm control within the advanced control system, a further embodiment of the present invention relates to application of aggressive control action in the event of a serious process upset situation to restoring the process state to a safe and stable condition in a timely manner. In another U.S. Patent (U.S. Pat. No. 7,194,318) by the same inventor, a form of asymmetrical control actions are presented which would permit a varying degree of aggressive control actions while maintaining the process stability and integrity in dealing with a severe process upset in which the entire operating range of control can be deployed without unduly restricted by the normal operation tuning or rate of change constraints. One particular form of control action in this respect is what is characterized as "braking action" in which the process is aggressively but safely brought to a safe operating point. Thus, the same advanced control system can be used to steer the process to previously (safe operation) check pointed state. In this respect, the operator can choose to bring the process to a previously safe operating state from the list of previously check pointed safe operation. The main benefit of this is that the operator would feel confident that the advanced control system would apply as necessary aggressive control action while maintaining the process safety and product quality control in recovering from an unsafe and unstable process situation. One key weakness of prior art MPC is that it operates with symmetrical control action in that it will apply same amount of control action irrespective of sign of error. Thus, in prior art there is no way to differentiate magnitude of control action in accordance with sign of violation. Therefore, any increase in aggressive control action for dealing with an alarm condition would mean the controller would apply the same aggressive level of control action on the other side of the violation causing the process instability. Thus it is not uncommon that prior art MPC is taken off under severe process upset condition. In contrast, what is really required is asymmetrical form of control without loss of the process stability to deal with severe process upset condition. This can be accomplished by addition of the following constraints.

In accordance with the prior patent by the same inventor (U.S. Pat. No. 7,194,318), it is to postulate that all physical systems possess a certain amount of capacity for material and energy holdup. Thus, a physical system can remain stable within its material and energy holdup capacity and any imbalances in either material or energy would induce process instability. Therefore, in order to keep the process under dynamic stability, the following inequalities be satisfied for a change in state. That is, $$-\eta H_m \leq \Sigma \Delta F_{i,j} - \Sigma \Delta F_{o,k} \leq \eta H_m \qquad 3.1$$

$$-\eta H_e \leq \Sigma \Delta E_{i,l} - \Sigma \Delta E_{o,m} \leq \eta H_e \qquad 3.2$$

where
- $\Delta F_{i,j}$ is change in in-flow of material from stream j
- $\Delta F_{o,k}$ is change in out-flow of material from stream k
- $\Delta E_{i,l}$ is change in in-flow of energy from stream l
- $\Delta E_{i,m}$ is change in in-flow of energy from stream m
- $H_m$ is the material holdup capacity of the process
- $H_e$ is the energy holdup capacity of the process
- $\eta$ is speed of optimization factor
- i refers to in-flow
- o refers to out-flow
- j=1, Number of in-material flows
- k=1, Number of out-material flows
- l=1, Number of in-energy flows
- m=1, Number of out-energy flows Both (3.1) and (3.2) can be further stated as for all in flows and out flows, $$-0.5\eta H_m \leq \Sigma \Delta F_{i,j} \leq 0.5\eta H_m \qquad 3.1.1$$

$$-0.5\eta H_m \leq -\Sigma \Delta F_{o,k} \leq 0.5\eta H_m \qquad 3.1.2$$

$$-0.5\eta H_e \leq \Sigma \Delta E_{i,l} \leq 0.5\eta H_e \qquad 3.2.1$$

$$-0.5\eta H_e \leq -\Sigma \Delta E_{o,m} \leq 0.5\eta H_e \qquad 3.2.2$$

In the same manner, 3.1.1-3.2.2 can be further stated as for each individual in/out flow, $$-0.5\eta H_m \leq \Delta F_{i,j} \leq 0.5\eta H_m \qquad 3.1.1.1$$

$$-0.5\eta H_m \leq -\Delta F_{o,k} \leq 0.5\eta H_m \qquad 3.1.2.1$$

$$-0.5\eta H_e \leq \Delta E_{i,l} \leq 0.5\eta H_e \qquad 3.2.1.1$$

$$-0.5\eta H_e \leq -\Delta E_{o,m} \leq 0.5\eta H_e \qquad 3.2.2.1$$

Figure 5B:
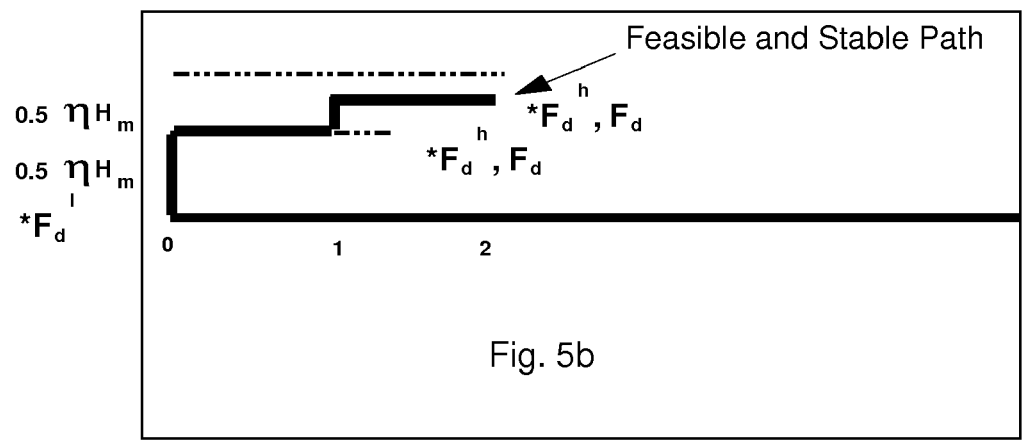
Figure 5C:
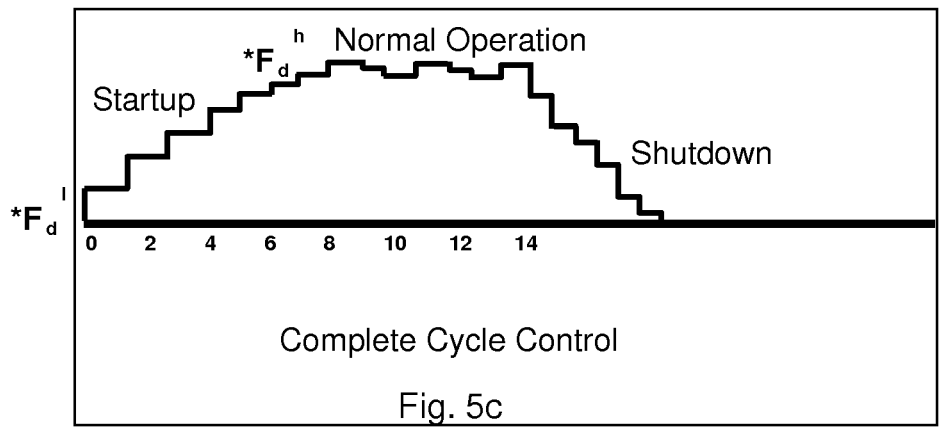

The stability criteria as stated above are not operatively useful. The restatement below provides a practically useful method of stable directional optimization such that, $$-0.5\eta H_m + {}^*F_{i,j}{}^l \leq F_{i,j} \leq {}^*F_{i,j}{}^h + 0.5\eta H_m \qquad 3.1.1.2$$

$$-0.5\eta H_m - {}^*F_{o,k}{}^l \leq -F_{o,k} \leq -{}^*F_{o,k}{}^h + 0.5\eta H_m \qquad 3.1.2.1$$

$$-0.5\eta H_e + {}^*E_{k,l}{}^l \leq E_{k,l} \leq {}^*E_{k,l}{}^h + 0.5\eta H_e \qquad 3.2.1.1$$

$$-0.5\eta H_e - {}^*E_{o,k}{}^l \leq -E_{o,k} \leq -{}^*E_{o,k}{}^h + 0.5\eta H_e \qquad 3.2.2.1$$

$$-0.5\eta H_m + \Sigma {}^*F_{i,j}{}^l \leq \Sigma F_{i,j} \leq \Sigma {}^*F_{i,j}{}^h + 0.5\eta H_m \qquad 3.1.1.1.1$$

$$-0.5\eta H_m - \Sigma {}^*F_{o,k}{}^l \leq -\Sigma F_{o,k} + 0.5\eta H_m \qquad 3.1.2.1.2$$

$$-0.5\eta H_e + \Sigma {}^*E_{k,l}{}^l \leq \Sigma E_{k,l} \leq \Sigma {}^*E_{k,l}{}^h + 0.5\eta H_e \qquad 3.2.1.1.1$$

$$-0.5\eta H_e - \Sigma {}^*E_{o,k}{}^l \leq -\Sigma E_{o,k} \leq -\Sigma {}^*E_{o,k}{}^h + 0.5\eta H_e \qquad 3.2.2.1.2$$

$$-\eta H_m + \Sigma {}^*F_{i,j}{}^l - \Sigma {}^*F_{o,k}{}^l \leq \Sigma F_{i,j} - \Sigma F_{o,k} \leq \Sigma {}^*F_{i,j}{}^h - \Sigma {}^*F_{o,k}{}^h + \eta H_m \qquad 3.3$$

$$-\eta H_m + \Sigma {}^*F_{i,j}{}^l - \Sigma {}^*F_{o,k}{}^l \leq \Sigma F_{i,j} - \Sigma F_{o,k} \leq \Sigma {}^*F_{i,j}{}^h - \Sigma {}^*F_{o,k}{}^h + \eta H_m \qquad 3.4$$

where, ${}^*F_{i,j}{}^l$ refers to lowest value of $F_{i,j}$ encountered ${}^*F_{i,j}{}^h$ refers to highest value of encountered The operation of (3.1.1.2) as a representative set is best illustrated graphically in FIG. 5a and FIG. 5b for two situations. In FIG. 5a, $F_{i,j}$ is increased less than the permitted limit of $0.5\eta H_m$ at Time 1 and Time 2 as determined by the optimizer due to the competing flows in (3.1.1.1.1). In FIG. 5b, a special case of this is shown for the feed rate to the unit. In this case, the feed rate is the only flow appearing in (3.1.1.1.1) and can be increased to the maximum limit of $0.5\eta H_m$ by the optimizer if unhindered by any other constraint. However, as the feed rate approaches its final optimal steady state, the last increase may be less than $0.5\eta H_m$. As shown in FIGS. 5a & 5b, the high inequality limit in (3.1.1.2) is dynamically expanded while the low limit remains unchanged. In the opposite situation of what is depicted in FIGS. 5a & 5b, the low limit is dynamically expanded while the high limit remains unchanged. Therefore, as the value of $F_{i,j}$ increases or decreases, the appropriate limits are dynamically expanded as an enhanced formulation of MPC. This limit expansion is augmented with each step of optimization during each control cycle, as part of a receding horizon control scheme. As a result, all of the inequality constraints stated above will be updated dynamically at every control cycle both individually and collectively. The end effect is that at any time the optimizer can only push the variables to the nearest limit no more than $0.5\eta H_m$. The inequality limit remains open on the opposite side, thereby providing a much larger move towards it in the event if the variables were to be retracted. As a result, any process variable can return to its respective initial value unconstrained by $0.5\eta H_m$. This is an asymmetrical directional move capability that can be used for the process to be returned to any prior state (see FIG. 5c). For instance, the optimizer will initially increase the feed rate to the process unit progressively with the permitted limit of $0.5\eta H_m$. However, in response to an adverse disturbance condition, the optimizer will cut the feed rate aggressively up to the initial value of the feed rate and subsequently at the constrained rate of $0.5\eta H_m$. This provides for asymmetrical control actions by which the EDACS can fully reverse the dynamic path in response to an adversely disturbed process. In the event the feed rate is aggressively cut, all of the other stability related variables would also be changed appropriately. As a result, all of the stability variables can move up or down in unison as the process moves towards the optimal targets under normal conditions or in response to adverse operating conditions while keeping the process within the safe operating limits. Moreover, even under adverse process situations, the controller will respond without resorting to situation based tuning changes. For instance, in response to a favorable disturbance such as increase in calorific value of the fuel gas, the EDACS will progressively push the feed rate to a higher value. However, in response to sudden loss of fuel gas header pressure, it can reduce the feed rate by 50 percent or more without a loss of process stability. In fact, this asymmetrical control action capability allows an EDACS to be capable of returning the process to any previous feasible and stable operating point quickly. The asymmetrical control capability can provide what can be considered as Complete Cycle Control where a process goes through startup, normal operation and shutdown. During startup, feed rate is increased to its optimum target gradually while keeping product qualities within the spec, followed by a period of normal operation during which the feed rate is varied in response to disturbances, and finally followed by either a planned or unplanned shutdown. This complete cycle control capability can be adapted to operate a batch process e.g. a batch distillation wherein both the heat input and the reflux is gradually increased to the maximum value in accordance an optimal control policy, followed by a period of constant operation and finally followed by shutdown also in accordance with an optimal policy.

In accordance with the present invention, a braking action is included in the inequality constraint of each of the flows involved in material and energy imbalance to cause them to perform a forced reversal in direction, e.g. Eqn_(3.1.1.2) is modified as $$-0.5\eta H_m + {}^*F_{i,j}{}^l \leq F_{i,j} \leq {}^*F_{i,j}{}^h + 0.5\eta H_m - b^*(F_{i,j}{}^* - {}^*F_{i,j}{}^l) \qquad 3.1.1.3$$

where, b is rate of braking action (i.e. de-acceleration)

$F_{i,j}{}^*$ is current value of $F_{i,j}$

Thus, for startup and normal operation, b=0, for shutdown $0<b<=1$. The braking action permits controlled removal of material and energy from a process without loss of stability.

As a part of embedded alarm control, the braking action can be invoked for aggressive but stable recovery actions, which could not be done with the prior art with its separation of advanced control and alarm management control. The barking action is meant to be used within the current range of the manipulated variables with a varying degree of aggressive recovery action while keeping the process under stable condition. The inventive step in this regard is to steer the process towards previously observed or recognized stable state (check pointed state) in a deliberate aggressive manner. Further, to recognize that operation of a process goes through a cycle involving startup, normal operation and shutdown. In all these three phases of cycle operation, the process has to remain stable at all time to avoid complete breakdown. It is logical therefore that in response to an alarm situation, the process needs to backtrack to a previous safe condition. For most part, this means unloading the process of energy and/or material. Thus, a process that is controlled within the constraints of controlled imbalance of material and energy as disclosed in U.S. Pat. No. 7,194,318 by the present inventor, can be managed with varying level of braking action in response to alarm violations and recovery actions with embedded alarm control as disclosed herein.

In summary, the present invention offers a novel method of managing alarms in a process within advanced control such that depending on the severity of a process upset; the advanced control system with embedded alarm control in accordance with the invention would apply different level of controls. That is, at the lowest level of process severity where the controlled variables violate their alarm limits, the embedded alarm avoidance control disclosed above would assist in avoiding hitting the alarm limits, at the next level of process severity where the advanced control is devoid of adequate manipulated variable range, the manipulated variable range relaxation disclosed above would assist in both avoiding hitting the alarm limits and in recovery from the alarm violations, at the next level of process severity where the advanced control is not limited by the manipulated variable range but is constrained by the control limits of one or more controlled variables, the controlled variables limiting can have their control limits relaxed up to the alarm limits, at the ultimate level of process severity all of the above level of embedded alarm control could fail, the operator would deploy emergency shut down procedure using the braking action.

Contextual Alarming

Figure 11:
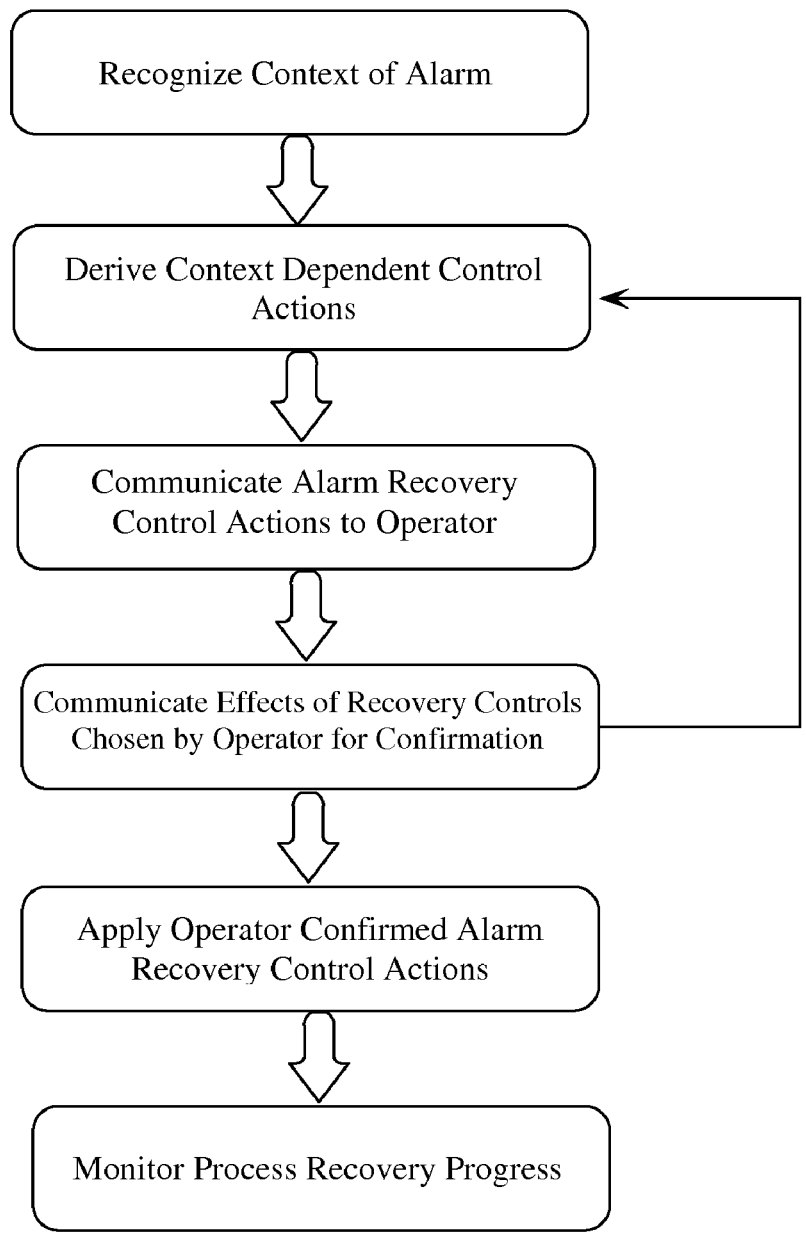
FIG. 11 is a block diagram of the Contextual Alarm Control
Figure 12A:
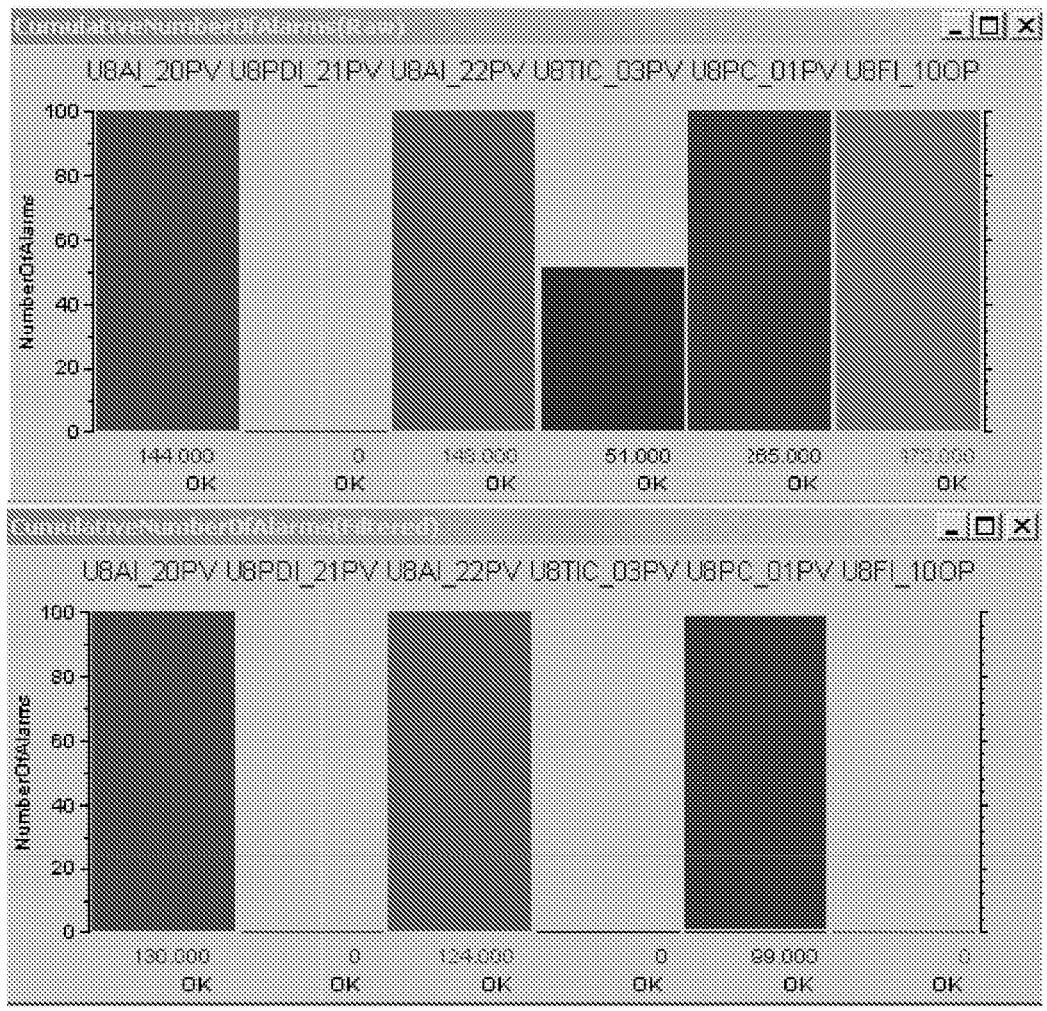
FIG. 12a is a graphical representation of the As per Prior Art Raw/Filtered Alarms
Figure 12B:
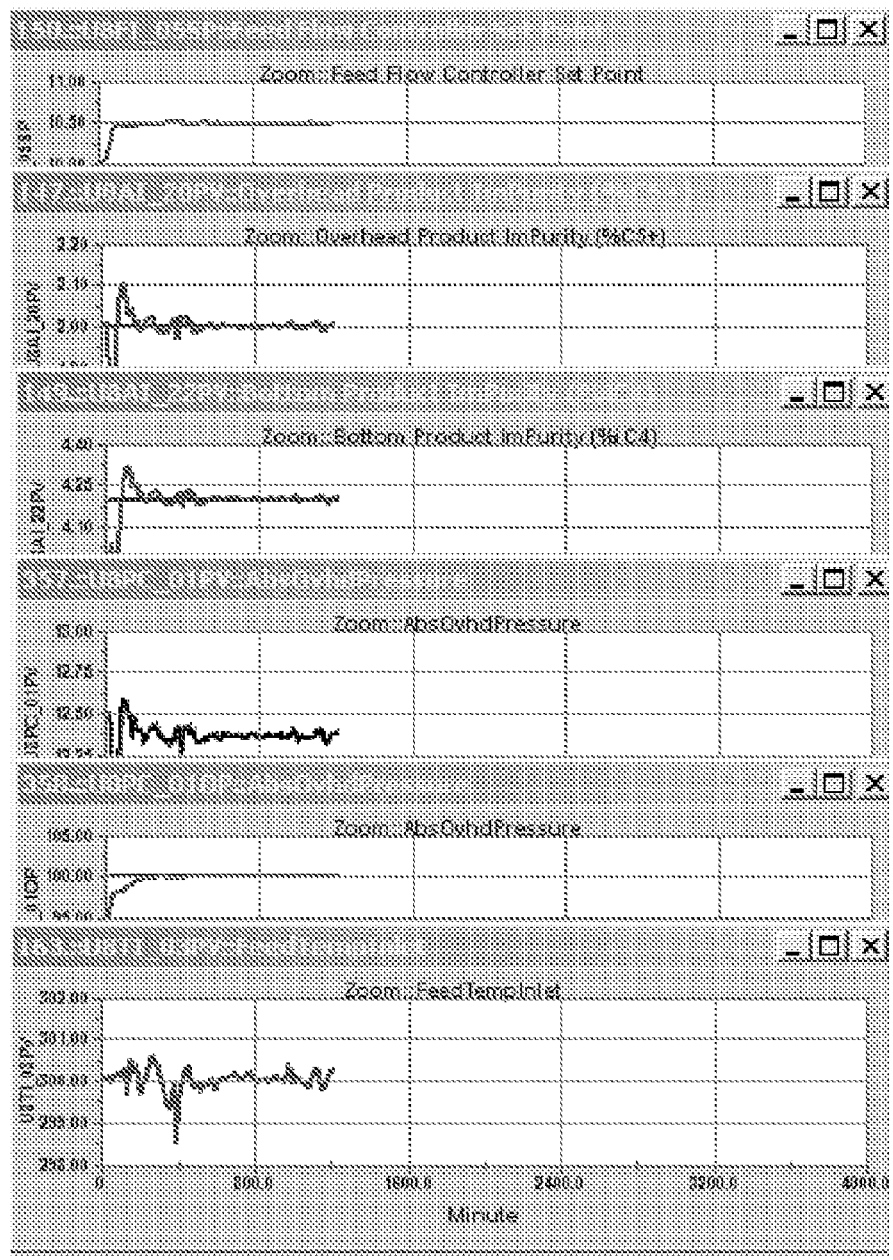
FIG. 12b is a graphical representation of the As per Prior Art Raw/Filtered Alarms Details
Figure 13:
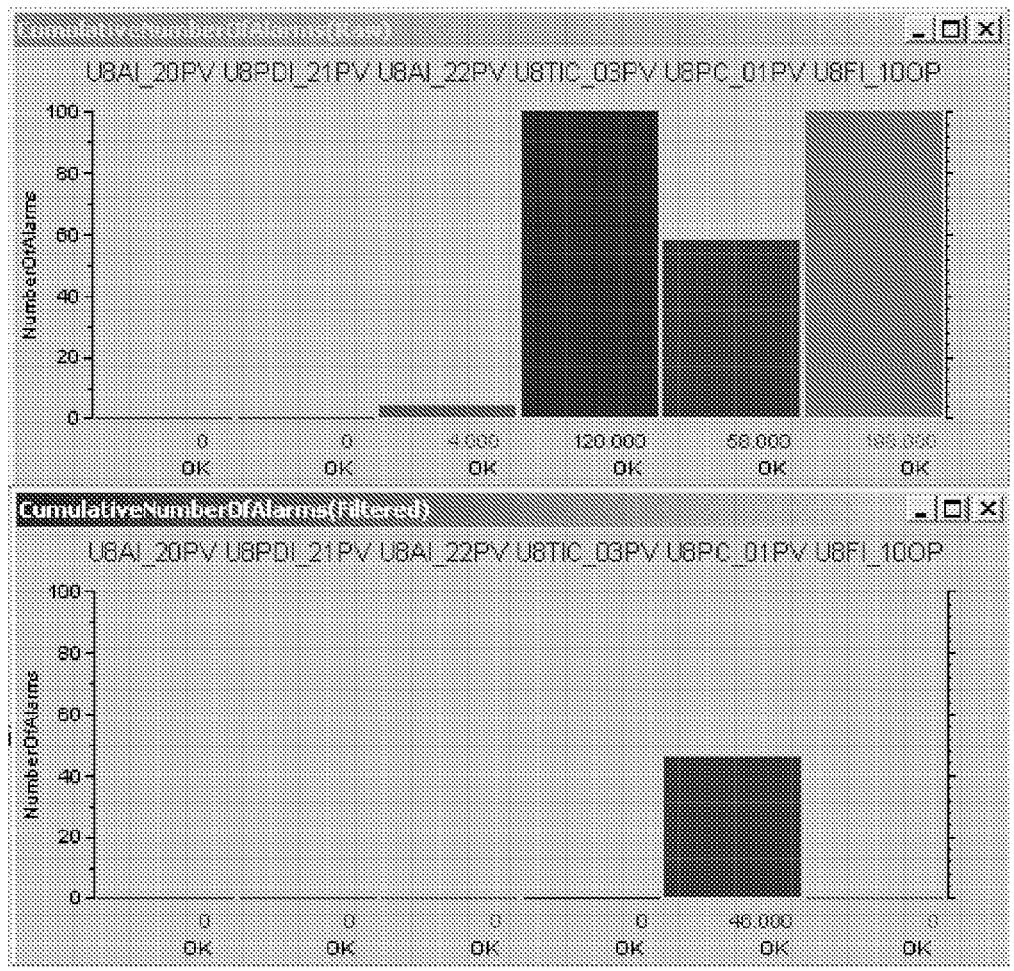
FIG. 13 is a graphical representation of the As per the present invention Raw/Filtered Alarms
Figure 14:
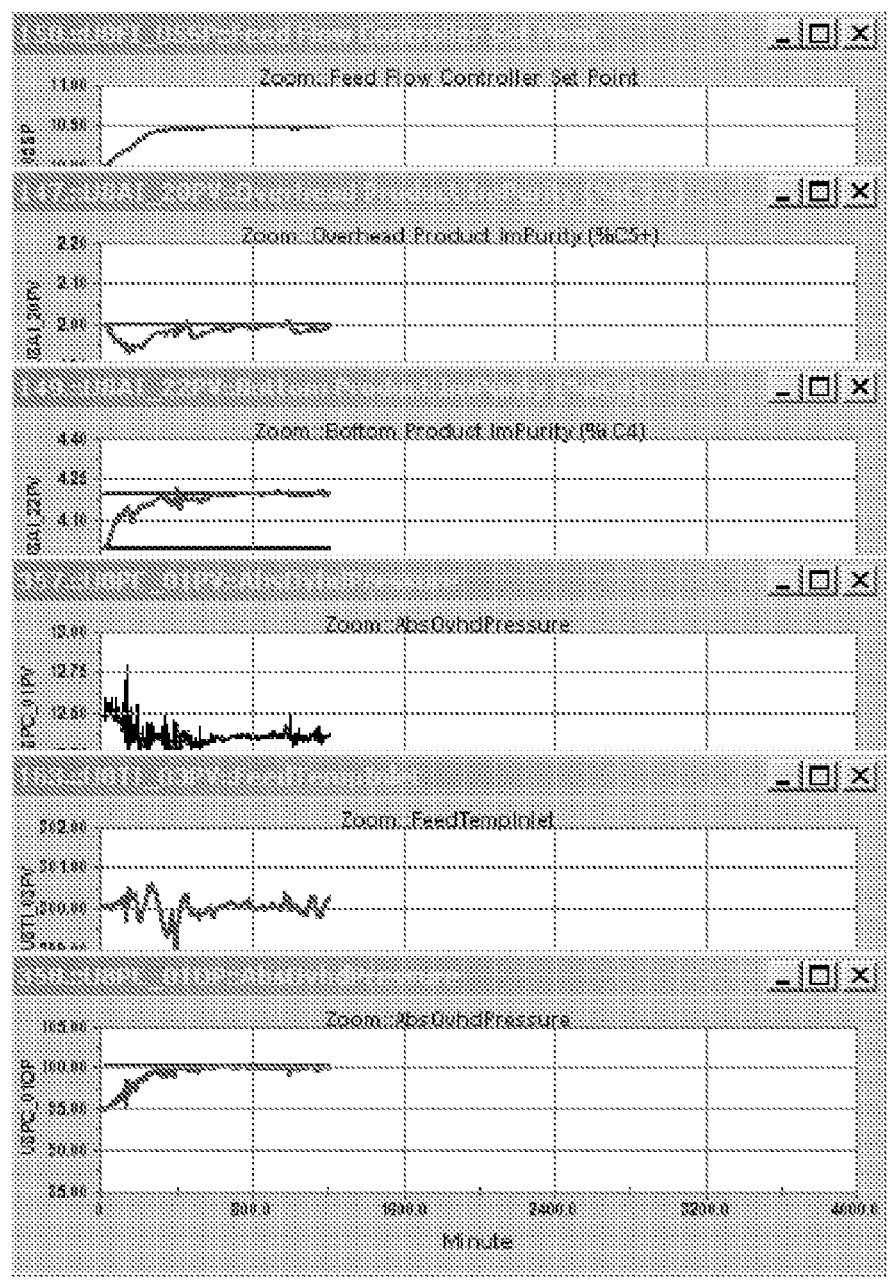

Another embodiment of the present invention relates to what is described herein as "Contextual Alarm Control" based on the specific state of control or lack of control of the process as a whole, its sub-processes and its variables. FIG. 11 depicts the basic steps of the contextual alarm control in collaboration with an operator. The basic premise of alarming employed is to inform the operator of the varying degree of loss of control across the process during a process upset so as to communicate to him in a meaningful way as to where in the process lacking in control. With the embedded alarm control within an advanced control system as proposed in this invention, a meaningful context relating to loss of control over the process can be discerned and communicated to the operator both for informing him of the extent and characteristics of alarm situation and the various recovery control actions available from the advanced control system. Furthermore, the operator can be assisted in his decision as to how to recover by providing him with the effects of various recovery controls options so that he would know what to expect and when in the recovery process.

At the very top level of context, when an advanced control system with the embedded alarm control determines that it can not control the process as a whole to all of its control limits in steady state then clearly an alarming of that to the operator would indicate a cause for concern. In this context, it would be as disclosed above, the operator can be informed of which MV or CV need to be relaxed.

At the next level down, even though the process as a whole is determined to be controllable to all of its control limits, however, given the variability of measured and unmeasured disturbances, the process could experience dynamic deviation from its control limits and including alarm limits. Thus, at this level, if a controlled variable is predicted to violate its control limit but not its alarm limit then there is no cause for concern and hence no need for alarming. Whereas, if the controlled variable is predicted to violate its alarm limit at future time, even though the process as a whole is still controllable to its control limits in steady state then an alarm indicating this would be meaningful to the operator. A further variant of this would be to alarm based on a sub-process such as regulatory level control.

At the next level down, and the most common form of alarming that is prevalent in the industry as it relates to deviation alarm. A deviation alarm is given when actual value of a process variable deviates from its set point beyond a set limit. For instance if the furnace outlet temperature deviates higher from its set point by say 5 degree F., then high deviation alarm is given. In a process upset situation, even the process would return to normal range later, there could be a number of deviation alarms instances in the meantime. In normal operating environment, deviation alarms are therefore considered to be "nuisance", meaning not really helpful and necessary. Paradoxically, in a process upset situation also the operator would discount deviation alarms because they are considered to be caused by the upset and therefore not helpful. Once again, a contextual alarming of deviation from set point can be done that would minimize "nuisance" alarm and instead give operator alarms which would be meaningful in the context of the process upset. In an advanced control system with embedded alarm limits, deviation alarm can be internally filtered so as to alarm only those deviations that cannot be controlled either dynamically or in steady state. An example of this is given in the results presented below, indicating how this can help to reduce the number of deviation alarms significantly.

Summarizing, a structured contextual method of alarming can be developed based on the advanced control with the embedded alarm control in part using the results of such an advanced control with in part the requirements of the most meaningful actions that an operator can take to recover control that is beyond the advanced control system scope. In this way, the contextual alarm control would provide a way to continue control the process in conjunction with the operator actions. Thus, instead of the advanced control system being taken off as in the prior art, as per the invention, the advanced control system can continue to assist the operator during various phases of a process upset and its recovery to safe to normal operation. The contextual alarm control will ensure that at all time, the advanced control system and the operator remain engaged during all phases of process operation and control rather than have two separate systems. Thus, the advanced control system in accordance with the present invention would need to be more flexible than just do the traditional control function, it should be effectively an open system embodying all of the details of the process and its control requirement ranging from the lowest of regulatory control to the highest level of control such as using braking action to shut down it. Such an advanced control system with such a wide range of control range and capabilities can then be used with the embedded alarm control as proposed in the present invention to provide the operator all that is needed by way of alarming and process management. In other words, instead of needing a system to manage alarm as espoused in the traditional alarm management system, the embedded alarm control within the advanced control system will manage the process in accordance with the alarming approach and strategy the operator would want and feel comfortable with (as per the view presented in FIG. 2). An example of illustration of this embodiment of the present invention is given by comparison with the prior art in FIG. 12a through FIG. 14 and further discussed below.

Figure 6:
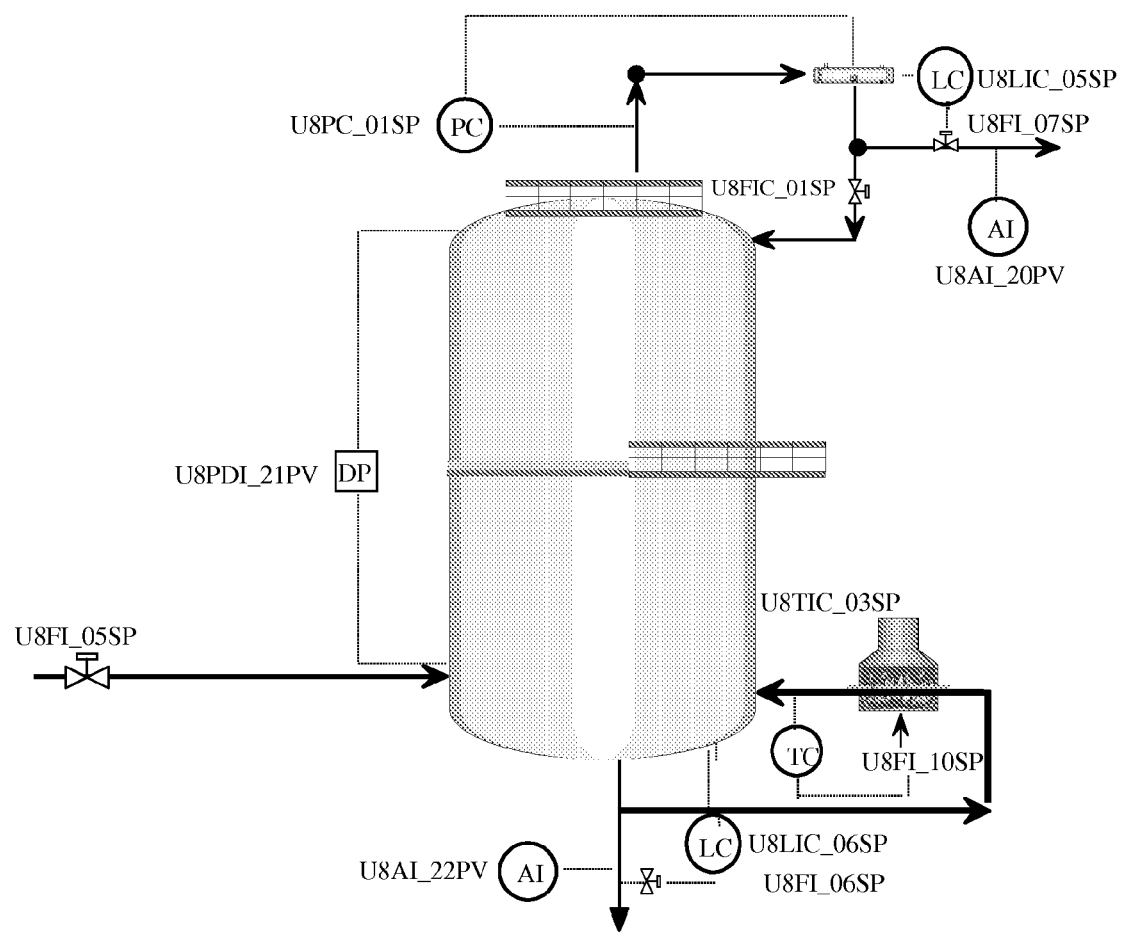
FIG. 6 is a schematic of the DeButanizer Schematic Process Flow Diagram

An example of this embodiment of the present invention demonstrating embedding of alarm control within a dynamic model predicative control is present. In FIG. 6 a schematic diagram of a typical DeButanizer process unit is depicted. In FIG. 7 a list of manipulated variables, controlled variables and feed forward variables is presented. As shown in FIG. 6, the process unit control includes a pressure-regulating loop along with the rest of control of the unit. A large MPC controller is constituted to include all of the variables listed in FIG. 7 including the pressure-regulating loop with 10 manipulated variables, 17 controlled variables and 2 disturbance variables.

As a demonstration of the application of the EDACS of this invention, the alarm limits relating to a total of six controlled variables namely U8AI_20PV, U8PDI_21PV, U8AI_22PV, U8TIC_03PV, U8PCI_01PV and U8FI_10P will be used. A total 4 cases of comparison is presented in which all of them have had the same alarm limits. The 4 cases of comparison correspond to 4 different ways of controller operation as follows.

Figure 8A:
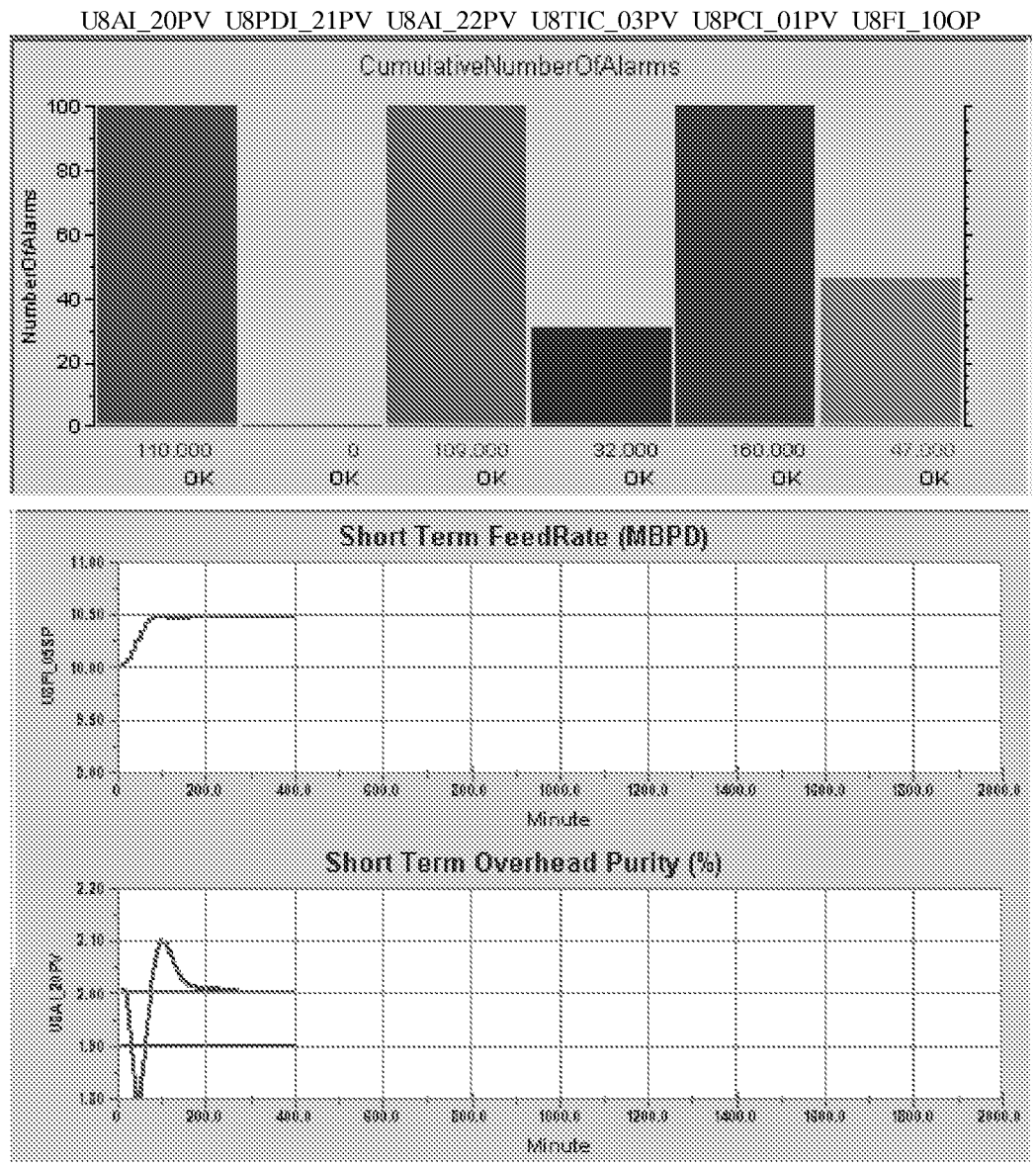
FIG. 8a is a graphical representation of the Alarm Response with Not Well Designed and Tuned prior art MPC

Case 1: In this case, the MPC is of the prior art but with same alarm limits. As shown in the data presented herein, the controller tuning is not particularly desirable but illustrates the case of what happens with alarm frequency in the presence of a poorly designed and tuned controller (see FIG. 8a).

Figure 8B:
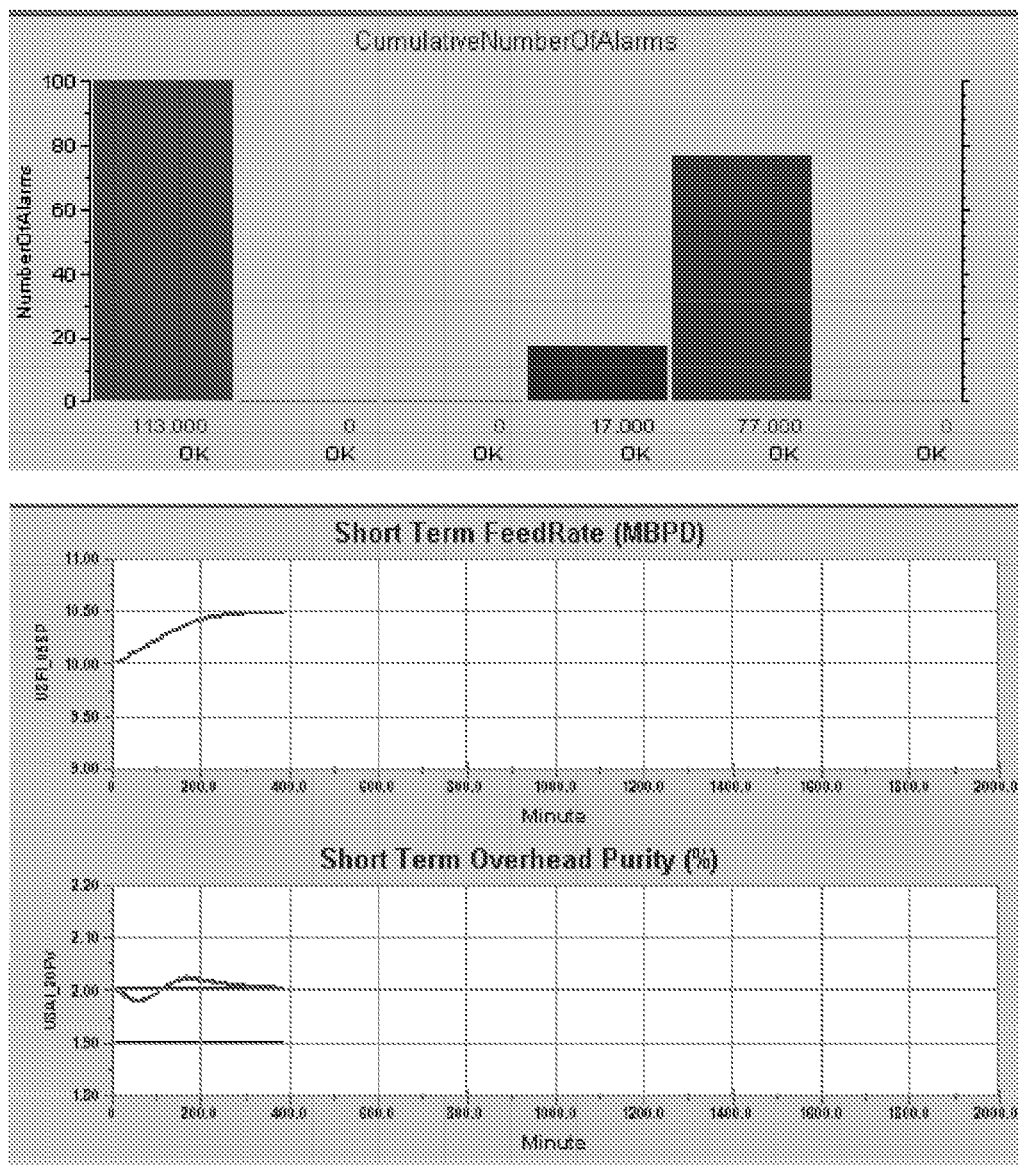
FIG. 8b is a graphical representation of the Alarm Response with Improved Controller Design and Tuning

Case 2: In this case, the MPC incorporates an improved controller design. This case illustrates how number of alarms can be reduced considerably with a better-designed and tuned controller (see FIG. 8b).

Figure 8C:
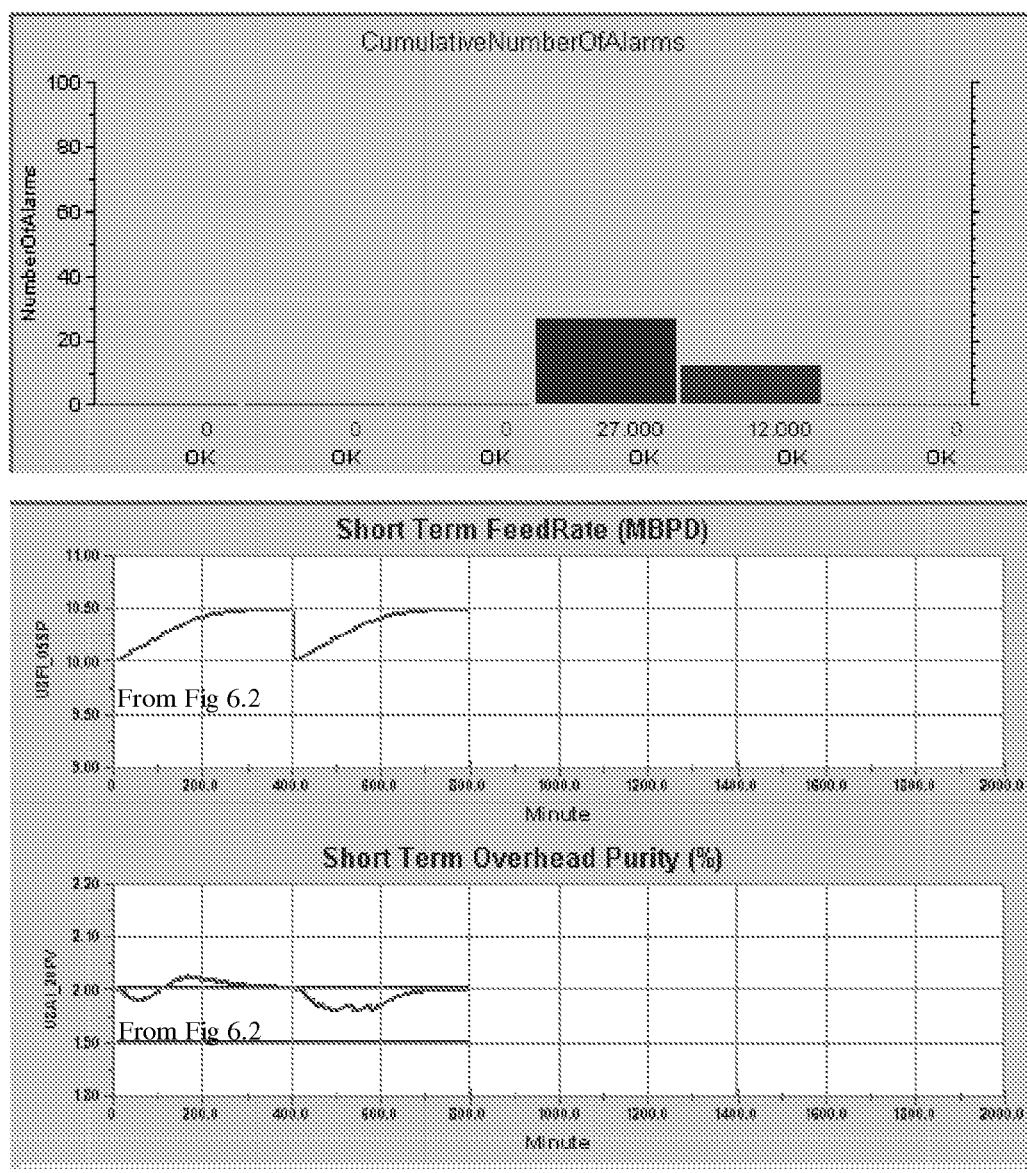
FIG. 8c is a graphical representation of the Alarm Response with Improved Controller Design and Tuning and Embedded Alarm Control

Case 3: In this case, the alarm limits are embedded within an EDACS in accordance in accordance with the present invention (see FIG. 8c).

Figure 8D:
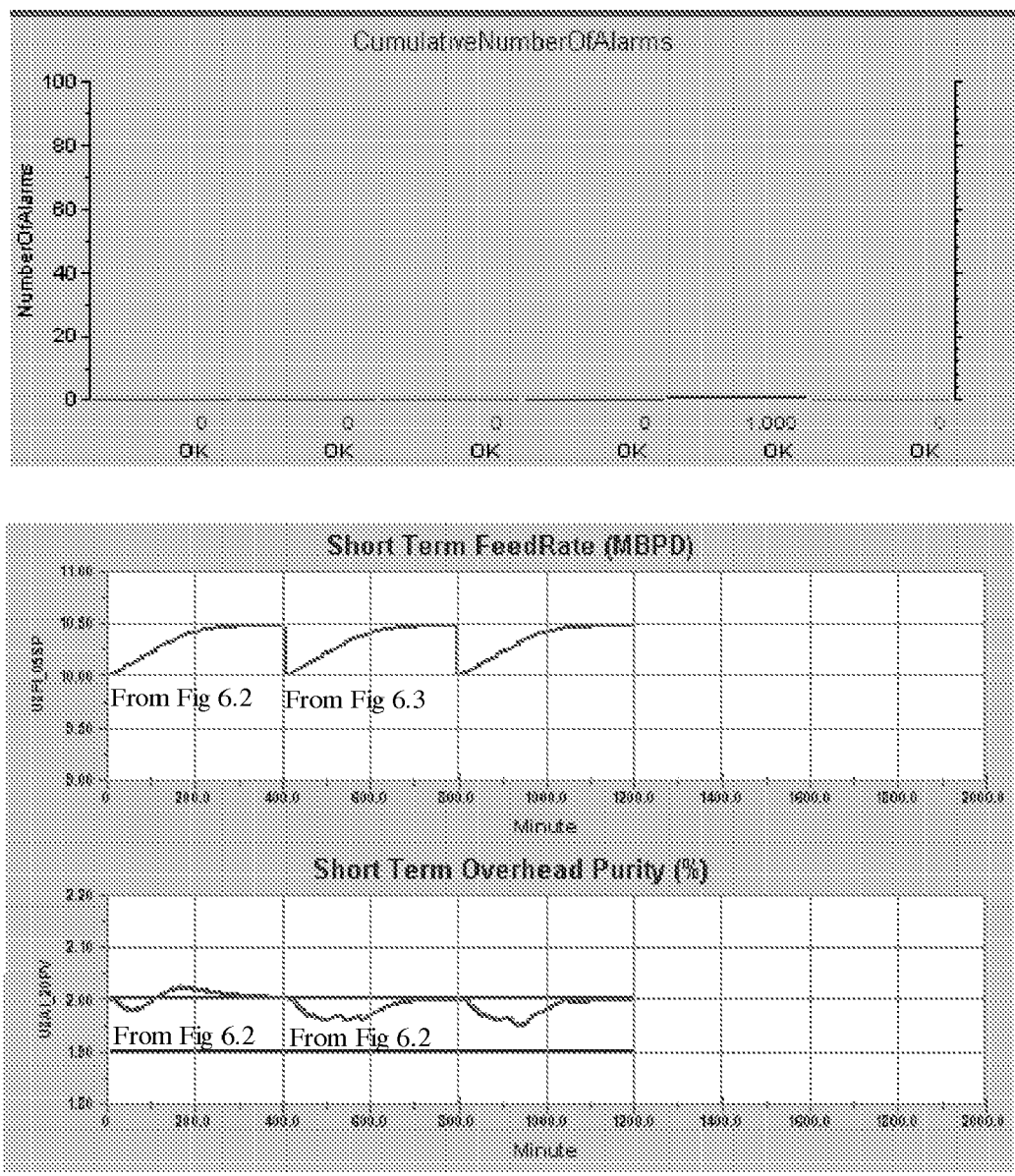
FIG. 8d is a graphical representation of the Alarm Response with EDACS with Embedded Alarm Control with Alarm Limits Tuned for Variable 4 & 5

Case 4: In this case, an improvement on Case 3 when the alarm limits are tuned to remove what can be considered as nuisance alarms relating to the deviations of two regulatory controlled variables namely, U8TIC_03PV, U8PCI_01PV (see FIG. 8d).

It is clear from the comparison of the above four cases that Case 1 presents the most number of alarms in what may be considered as too many alarms, in excess of 470, clearly not a desirable case at all. Case 2 demonstrates that alarm violation pattern can be improved with better-designed MPC. Case 3 shows almost 50 percent reductions from Case 1 simply from a better-designed controller. Case 4 shows a further reduction from case 3 of 90 percent. It shows how the embedding of alarm limits as proposed as per the present invention. Case 4 shows a further reduction over case 3 of almost 99 percent. This shows how the deviations alarm can be filtered out without loss of control. In fact Case 4 can be characterized as being "alarm-free" operation.

Figure 9:
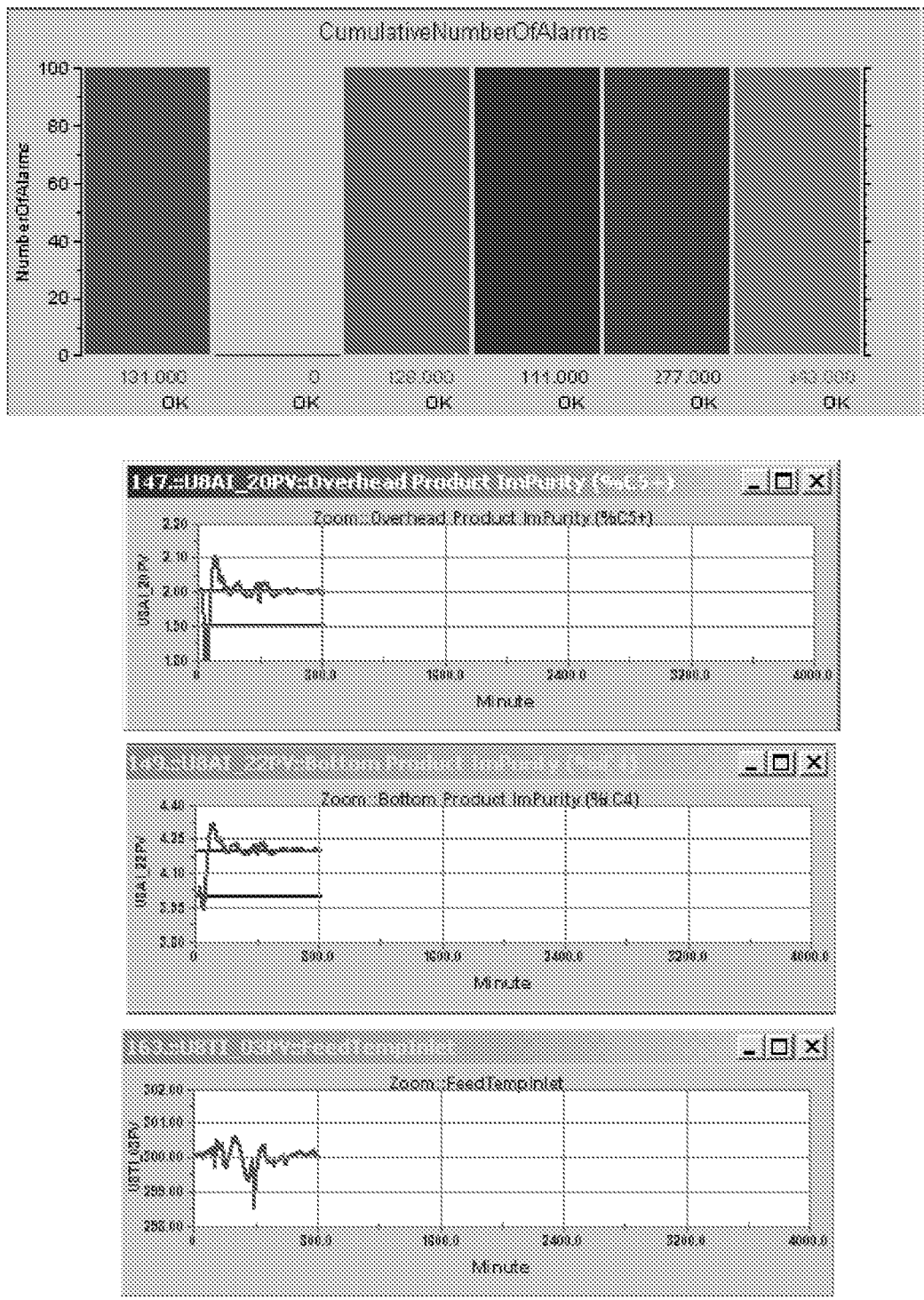
FIG. 9 is a graphical representation of the Alarm Response with Not So Well designed Prior Art MPC
Figure 10:
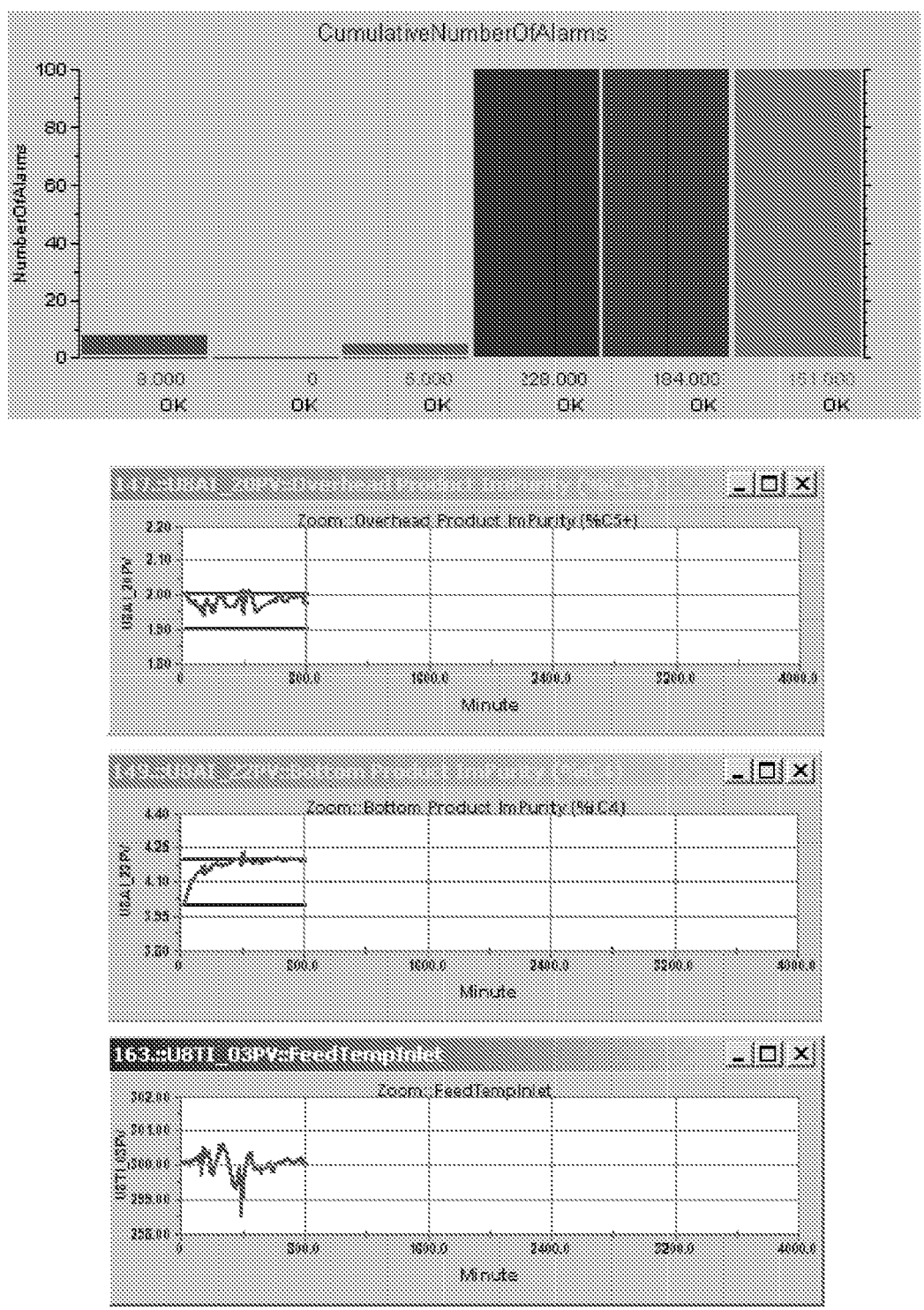
FIG. 10 is a graphical representation of the Alarm Response with Well designed EDACS with Embedded Alarm Control

Another two cases of alarm response with feed temperature disturbance variable are shown in FIG. 9 and FIG. 10. FIG. 9 would be a typical alarm response from a prior art MPC with no embedded alarm control in accordance with the present invention. FIG. 10 would be a much better improved response with almost 90 percent reduction in alarm violation of the two product qualities namely, overhead product and bottom product for the same disturbance in feed inlet temperature as in case of FIG. 9. Again, these comparisons in performance clearly demonstrate the beneficial impact of the present invention over the prior art.

In FIG. 12a-14 a comparison of the results of application of the contextual alarming are shown with the prior art MPC controller and EDACS as per the present invention. In both the cases same alarm limits are used with the identical process conditions except for the differences of the controller. In the case as per the present invention (FIG. 13), the number of raw alarms is significantly less than the prior art (FIG. 12a), whereas the number of filtered alarm is none. The contextual alarming can reduce number of alarms in the case of the prior art, but the most significant improvement is achieved when the embedded alarm control as proposed in the present invention is used within an improved controller design such as the EDACS. Therefore, it can be said that the embedded alarm control within any controller can reduce the number of alarms, however, the most significant improvements is realized with a better designed and robust controller; that is improved control means reduced alarming. A simple contextual filtering rule of controllability of the pressure control loop was utilized in this example.

In summary, the proposed method of embedding alarm limits has the potential of reducing number of alarms significantly, in the order of 90-95 percent compared to otherwise. This would significantly change the way presently alarms are handled within an advanced control system. It has the potential of amalgamating the alarm management system with the advanced control system resulting in improved control for normal operation as well as under process upset conditions and even under what is generally referred to in the industry as "Abnormal Situation".

In summary, the above-disclosed general form of the embedding of alarm limits within an advanced controller provides a rich variety of formulations that could be used in dealing with a many process-upset situations. The design of which would be based on consideration of judicious engineering balancing performance against computational time and complexity.

The optimization problem as described above can be solved with available solver today. The more complex and bigger the process is the more detailed computational steps would be required. For a linear dynamic system, a linear programming method of optimization incorporating the formulation as described herein would yield a combined steady state and dynamic control moves results for a model predictive controller. It is envisaged that for a non-linear dynamical system, appropriate non-linear optimization method would be employed.

It will be understood by those skilled in the art that various modifications and changes may be made to the present invention without departure from the scope.

What I claim:

1. A method of controlling an operation of a process having a plurality of independently controlled, manipulated variables, at least one controlled variables and none or more disturbance variables comprising the steps of:
    a) determining simultaneously for each of said manipulated variables a set number of future dynamic moves along with a future steady state value and for each of said controlled variable, a set number of predicted future dynamic values along with a future steady state value in accordance with steady state constraints and dynamic constraints relating to each of said manipulated variables and said controlled variables including where appropriate in accordance with future values relating to each of said disturbance variables;
    b) embedding alarm controls in a simultaneous dynamic control and steady state optimization in accordance with varying type of alarming situations and aiding operator in recovery actions; and
    c) performing a receding horizon form of control wherein said control is performed at successive time interval by monitoring and feedback of process responses resulting from the control actions applied at previous time intervals;
    wherein said control process further comprises an objective function J in the form of $J=F(M, C, D^d, M^d, C^d)+\Sigma\Sigma P^i_c C^i + \Sigma\Sigma P^h_c C^h$, wherein
      F is some optimizing function for the process over the time horizon of time to steady state for said process,
      $M^d$ is dynamic values of manipulated variables over a predetermined time horizon,
      M is steady state value of said manipulated variables,
      $C^d$ is dynamic values of controlled variables over a time horizon to steady state,
      C is steady state value of said controlled variables, $D^d$ is a dynamic value vector of said disturbance variables over a time horizon no greater than said time horizon of dynamic values of said manipulated variables, and wherein further the process is considered to be a dynamic system, and said controlled variables response both in steady state and dynamic is characterized by $(C, C^d)=G(M^d, D^d)$, $P^l_c$ is a penalty value to be applied for said controlled variable violating its low limit dynamically, $P^h_c$ is a penalty value to be applied for said controlled variable violating its high limit dynamically, further $\overline{C}^h_i$ is high limit dynamic violation variables of said controlled variables, $C_i$ and $\underline{C}^l_i$ is low limit dynamic violation variables of said controlled variables, $C_i$, the aforementioned control variables penalty relate to either economic criteria and/or safety criteria depending on the nature and characteristics of said controlled variable.

2. The method according to claim 1, wherein said steady state constraints comprise $$M^l \leq M \leq M^h$$

$$C^l \leq C \leq C^h$$

Where

M is steady state value of said manipulated variables
C is steady state value of said controlled variables
$M^l$ is low limit of said manipulated variables, M
$M^h$ is low limit of said manipulated variables, M
$C^l$ is low limit of said controlled variables, C
$C^h$ is high limit of said controlled variables, C.

3. The method according to claim 1, wherein said dynamic manipulated variables constraints comprise $$M^l \leq Md \leq M^h$$

$$-\Delta M_j^l \leq \Delta M_j \leq \Delta M_j^h$$

$$0 \leq \Delta M_j^+ \leq \Delta M_j^h$$

$$0 \leq \Delta M_j^- \leq \Delta M_j^l$$

$$\Delta M_j = \Delta M_j^+ - \Delta M_j^-$$

$$-(1/k)\Delta M_j^l \leq \Delta M_j^k \leq (1/k)\Delta M_j^h \text{ for } k=1 \ldots k_{MV}$$

where $\Delta M_j^1 = M_j^1 - M_j^*$ where $M_j^*$ being Current Value of $M_j$
$\Delta M_j$ is dynamic move of manipulated variable, j
$\Delta M_j^+$ is positive dynamic move of manipulated variable, j
$\Delta M_j^-$ is negative dynamic move of manipulated variable, j
$\Delta M_j^l$ is low limit of dynamic move of manipulated variable, j
$\Delta M_j^h$ is high limit of dynamic move of manipulated variable, j
$\Delta M_j^k$ is dynamic control move of said manipulated variable $M_j$ at time k from now
$M_j$ is optimal steady state value of said manipulated variable
$M_j^*$ is current value of said manipulated variable, j.

4. The method according to claim 1, wherein said dynamic constraints of said controlled variables comprise $$C_i^l <= C_i^k <= C_i^h$$

$$-\theta \leq C_i^k - C_i^{k\,ref} - \overline{C}^h_i + \underline{C}^l_i \leq \theta$$

$$0 \leq \overline{C}^h_i$$

$$0 \leq \underline{C}^l_i$$

where $C_i^k$ is predicted value of said Controlled Variable i at k time interval from now
$C_i^l$ is low limit said Controlled Variable i,
$C_i^h$ is high limit said Controlled Variable i,
$C_i^{k\,ref}$ is desired value of said Controlled Variable i, $C_i$ at k time interval from now,
$\overline{C}^h_i$ is high limit dynamic violation variables of said Controlled Variable i, $C_i$
$\underline{C}^l_i$ is low limit dynamic violation variables of said Controlled Variable i, $C_i$
$C_i^{k*}$ is dynamic value of said Controlled Variable $C_i$ at time k based on the past process condition
$\theta$ is a permitted tolerance for deviation of the predicted dynamic value of said controlled variable from its reference path, a small number
k relates to future time from now on, $k=1 \ldots k_{MV} \ldots k_{CV}$
$k_{MV}$ relates to the control horizon for manipulated variables moves,
no manipulated variables moves to be applied beyond this time horizon so as to permit said controlled variables to attain their steady state,
$k_{CV}$ relates to the time to steady state for said controlled variables, it would be the longest time to steady state for the changes in said manipulated variables.

5. The method according to claim 1, wherein the optimizing function, $F(M, C, D, M^d, C^d)$ is $P_m M + P_c C$ devoid of effects of dynamic values of said manipulated variables and said controlled variable on optimizing function F( ), where $P_m$ is the price value for said manipulated variables, typically a negative value representing cost and a positive value representing benefit,
$P_c$ is the price value for said controlled variables, typically a negative value-representing penalty and a positive value representing benefit.

6. The method according to claim 1, wherein the controlled variables dynamic response, $(C, C^d)=G(M^d, D^d)$ is one of linear dynamic form represented as $C_i = C_i^* + \Sigma g_{i,j}(M_j - M_j^*)$ for steady state, and as $C_i^k = C_k^{k*} + \Sigma\Sigma g_{i,j}^k \Delta M_j^k + \Sigma\Sigma g_{i,l}^q \Delta D_l^q$ for dynamic response Where $C_i^*$ is the currently predicted steady state value of said controlled variable based on past changes in said manipulated variables and said disturbance variables
$C_i$ is the steady state value of said controlled variables
$C_i^k$ is predicted value of said Controlled Variable, $C_i$ at k time interval from now
$C_i^{k*}$ is dynamic value of said Controlled Variable $C_i$ at time k based on the past process condition
$g_{i,j}$ is the steady state gain of the step response model of said Controlled Variable, $C_i$ for a unit change in said manipulated variable, $M_j$
$g_{i,j}^k$ is the step response coefficient of the process model of Controlled Variable, $C_i$ for a unit change in said manipulated variable, $M_j$
$\Delta D_l^q$ is change in $D_l$ at time q
$g_{i,l}^q$ is the step response coefficient of the process model of Controlled Variable, $C_i$ for a unit change in said disturbance variable, $D_l$
k relates to future time from now on, $k=1 \ldots k_{MV} \ldots k_{CV}$
q relates to future time from $1 \ldots q_{FV}$
where $k_{MV}$ relates to the control horizon for manipulated variables moves, no manipulated variables to be applied beyond this time horizon so as to permit said controlled variables to attain their steady state, whereas $k_{CV}$ relates to the time to steady state for said controlled variables, it would be the longest time to steady state for the changes in the manipulated variables, M plus the longest control horizon, it will be assumed that it relates to the maximum time to steady state considering all of the responses of said controlled variables for the changes in all of the manipulated variables plus the longest of the control horizon of all of the manipulated variables, where $q_{FV}$ is ranged in accordance with future known values.

7. The method according to claim 1, wherein said embedding alarm controls additionally comprises;

when relating to product quality controlled variables the following constraint is added to said simultaneous dynamic control and steady state optimization, $$-\theta + f_a^{l*}(C_a^l - C_c^l) + C_c^l \leq C_i^k - C_c^h + \underline{C}_i^l \leq \theta + f_a^{h*}(C_a^h - C_c^h) + \overline{C}_c^h$$

where,
$C_c^l$ is control low limit
$C_a^l$ is alarm low limit
$C_c^h$ is control high limit
$C_a^h$ is alarm high limit
$f_a^l$ is an operator set factor for the low alarm limit in the range (0,1.0)
$f_a^h$ is an operator set factor for the high alarm limit in the range (0,1.0)
$\theta$ is a small value for numerical tolerance close to zero value
$C_i^{k\,ref}$ is replaced by $C_c^l$ at low limit violation and by $C_c^h$ at high limit violation.

8. The method according to claim 1, wherein said embedding alarm controls additionally comprises;

when one of said controlled variables is predicted to violate the alarm limit in closed loop, the following constraint is added to said simultaneous dynamic control and steady state optimization for correction, $$-\theta + A_a^l \leq C_i^k - \underline{A}_i^h + \underline{A}_i^l \leq \theta + A_a^h$$

where additionally,
$A_a^l$ is alarm low limit
$A_a^h$ is alarm high limit
$\underline{A}_i^h$ is dynamic violation variables of said controlled variable, $C_i$ from $A_a^h$
$\underline{A}_i^l$ is dynamic violation variables of said controlled variable, $C_i$ from $A_a^l$
$\theta$ is a small value for numerical tolerance close to zero value
Both $A_i^h$ and $A_i^l$ are treated in the same manner as $C_i^h$ and $\overline{C}_i^l$ albeit with different penalties in the modified objective function as follows $$J = P_m M + P_c C + \Sigma\Sigma \underline{p}_c^l \underline{C}^l + \Sigma\Sigma \overline{p}_c^h \overline{C}^h + \Sigma\Sigma \underline{p}_c^l \underline{A}^l + \Sigma\Sigma \overline{p}_c^h \overline{A}^h$$

Where additionally,
$\underline{p}_c^l$ is a large penalty value to be applied for said controlled variable violating its alarm low limit dynamically
$\overline{p}_c^h$ is a large penalty value to be applied for said controlled variable violating its alarm high limit dynamically.

9. The method according to claim 1, wherein said embedding alarm controls additionally comprises;

when responding to severe process upset requiring dynamic expansion of said manipulated variables the following constraint is added to said simultaneous dynamic control and steady state optimization, $$M_c^l - f_a^{l*}(M_c^l - M_a^l) \leq M - M_s^h + M_s^l \leq M_c^h + f_a^{h*}(M_a^h - M_c^h)$$

$$M_a^l \leq M + M_s^h - M_s^l \leq M_a^h$$

where
$M_s^h$ is optimizer slack variable for violating high limit with penalty value
$M_s^l$ is optimizer slack variable for violating low limit with penalty value
$M_c^h$ is high control limit
$M_c^l$ is low control limit
$M_a^h$ is high alarm limit
$M_a^l$ is low alarm limit
$f_a^h$ is high control limit relaxation factor
$f_a^l$ is low control limit relaxation factor.

10. The method according to claim 1, wherein said embedding alarm controls additionally comprises;

when responding to severe process upset requiring dynamic expansion of said controlled variables limits the following constraint is added to said simultaneous dynamic control and steady state optimization as follows, $$C_c^l + f_a^{l*}(C_a^l - C_c^l) \leq C - C_s^h + C_s^l C_c^h + f_a^{h*}(C_a^h - C_c^h)$$

$$C_a^l \leq C + C_s^h - C_s^l \leq C_a^h$$

where
$C_s^h$ is optimizer slack variable for violating high limit with penalty value
$C_s^l$ is optimizer slack variable for violating low limit with penalty value
$C_c^h$ is high control limit
$C_c^l$ is low control limit
$C_a^h$ is high alarm limit
$C_a^l$ is low alarm limit
$f_a^h$ is high control limit relaxation factor
$f_a^l$ is low control limit relaxation factor.

11. The method according to claim 1, wherein said embedding alarm controls additionally comprises:

when a process variable not currently included within the scope of said simultaneous dynamic control and steady state optimization violates its alarm limit then said violating variable is included within the scope of said simultaneous dynamic control and steady state optimization in real time with its embedded alarm limits in accordance with the method of alarming desired in order to perform on-demand alarm violation correction.

12. The method according to claim 1, wherein said embedding alarm controls additionally comprises:

a method of Contextual Alarming and recovery actions to aid said operator in recovery actions comprising of the steps:

alarming when said simultaneous dynamic control and steady state optimization can not find a feasible steady state solution and providing assistance to said operator in recovery action in regard to the extent of relaxation of either said manipulated variables high/low control limits within high/low alarm limits or controlled variables high/low control limits within high/low alarm limits;

alarming when said controlled variable's control limits or alarm limits are violated dynamically in closed loop prediction and providing assistance to said operator in elimination or mitigation of said predicted dynamic violations;

alarming when regulatory controllers related said controlled variables deviation in the context of predicted steady state infeasibility and/or predicted closed loop dynamic violation of one or more said controlled variables; and assisting said operator in directing said process to a previously known safe operating state involving a varying degree of braking action that would remove any one of energy and material.

13. A method of embedding alarm control within a model predictive controller of a process having a plurality of independently manipulated variables, at least one controlled variable and disturbance variables, said method comprising the steps of:

devising a method of steady state optimization and dynamic control within said model predictive controller that generates simultaneously for each of said manipulated variables, a set number of future dynamic moves along with a future steady state value, and for each of said controlled variables, a set of predicted future dynamic values and a future steady state value in accordance with steady state constraints and dynamic constraints for each of said manipulated variables and controlled variable including where appropriate in accordance with future values of said disturbance variables;

embedding additionally alarm control within said method of optimization and control by modifying said steady state and dynamic constraints of said manipulated variables and controlled variables in accordance with varying alarming situations and aiding an operator in recovery actions; and performing a receding horizon form of control wherein said optimization and control is performed at successive time intervals by monitoring and feedback of the process responses resulting from the manipulated variables dynamic move applied at previous time intervals.

14. The method of embedded alarm control of claim 13, wherein said step of embedding of alarm control further comprising the steps of:

modifying said constraints relating to said controlled variables in accordance with an extent and type of alarm avoidance being sought by the operator which for non-regulatory controlled variables constitute violations of low and high limits and for regulatory controlled variables constitute violations of low and high limits of deviation from a set point of said low and high limits; and applying a method of closed loop dynamic predictive alarming or simply predictive alarming when a controlled variable is predicted to violate the alarm limits in future time.

15. The method of embedded alarm control of claim 14, wherein said low and high alarm limit violation further comprising an operator set parameter to affect the extent of alarm avoidance.

16. The method of embedded alarm control of claim 13, wherein said step of aiding an operator in recovery actions further comprises one or more of the steps:

relaxing manipulated variables low and high limits range;
relaxing controlled variables low and high limits range;
doing on-demand alarm violation correction;
applying asymmetrical control action employing braking action; and
performing contextual alarming, depending on the severity of the predicted alarm limits violations.

17. The method of embedded alarm control of claim 16, wherein said manipulated variables limit range relaxing further include an extension of a normal operating limit range of said manipulated variables limit range to determine a feasible optimization and control solution that is necessary and adequate to achieve a desired recovery action.

18. The method of embedded alarm control of claim 16, wherein said relaxing controlled variables limit range further include extending of the limits range in conjunction with and in limitation of said manipulated variables limit range relaxation.

19. The method of embedded alarm control of claim 16, wherein said doing on-demand alarm correction relates to a method of alarm control for the variables that are not currently within the scope of the optimization and control but are in the state of alarm violation comprising the steps of:

expanding dynamically the list of variables in the controller; and
embedding the variables' alarm limits to aid the operator in recovery actions.

20. The method of embedded alarm control of claim 16, wherein said applying asymmetrical control action relates to a method of employing braking actions that is capable of steering the process to a previously known safe operating state based on a controlled removal of material and energy from the process under supervision of the operator across the entire process or part of the process; and wherein said performing contextual alarming relates to a method of aiding the operator in recovery action based on the varying degree of loss of control across the process during a process upset situation which constitutes a multi-level top down control starting with said manipulated variables range relaxation, said controlled variables range relaxation, said on-demand alarm violation correction and said asymmetrical control action employing braking action.

* * * * *